United States Patent [19]
Fukushima

[11] Patent Number: 5,359,422
[45] Date of Patent: Oct. 25, 1994

[54] DISPLAY DEVICE HAVING A PLURALITY OF DISPLAY MODES

[75] Inventor: Nobuo Fukushima, Yokohama, Japan

[73] Assignee: Canon Kabushiki Kaisha, Tokyo, Japan

[21] Appl. No.: 148,416

[22] Filed: Nov. 8, 1993

Related U.S. Application Data

[63] Continuation of Ser. No. 371,082, Jun. 26, 1989, abandoned.

[30] Foreign Application Priority Data

Jun. 29, 1988 [JP] Japan .................. 63-163110

[51] Int. Cl.$^5$ .............. H04N 1/00; H04N 5/30; G09G 3/02; G03B 17/18
[52] U.S. Cl. .................. 358/296; 348/341; 345/214; 354/465
[58] Field of Search .......... 358/296; 348/207, 335, 348/341; 341/23; 345/1, 4, 5, 25, 30, 38, 87, 204, 214; 354/410, 465

[56] References Cited

U.S. PATENT DOCUMENTS

| | | | |
|---|---|---|---|
| 3,502,804 | 3/1970 | Barr | 358/224 |
| 4,325,080 | 4/1982 | Satoh | 358/224 X |
| 4,589,029 | 5/1986 | Torimaru et al. | 358/224 |
| 4,599,653 | 7/1986 | Kimura et al. | 358/224 |
| 4,794,459 | 12/1988 | Moberg et al. | 358/224 X |
| 4,870,458 | 9/1989 | Shibuya et al. | 340/712 X |
| 4,885,575 | 12/1989 | Williams | 341/23 X |
| 4,885,580 | 12/1989 | Noto et al. | 341/23 |
| 5,012,280 | 4/1991 | Tsutsumi et al. | 340/712 X |

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

A display device having a plurality of display modes may be used with a recording apparatus which records received image information on a recording medium. An information display is provided for displaying data. Exposure correction circuitry corrects an exposure characteristic of the received image and provides exposure correction information in response to a setting operation. Circuitry is provided for generating an identification code to be recorded on the recording medium together with the image information. Control circuitry is provided having a first display mode for causing the display to display the correction information from the exposure correction circuitry when the exposure correction information has been set, and a second display mode for causing the display to display the identification code generated by the generating circuitry instead of the correction information when the exposure correction information has not been set.

26 Claims, 24 Drawing Sheets

FIG. 1

| FIG. 1A |
|---|
| FIG. 1B |

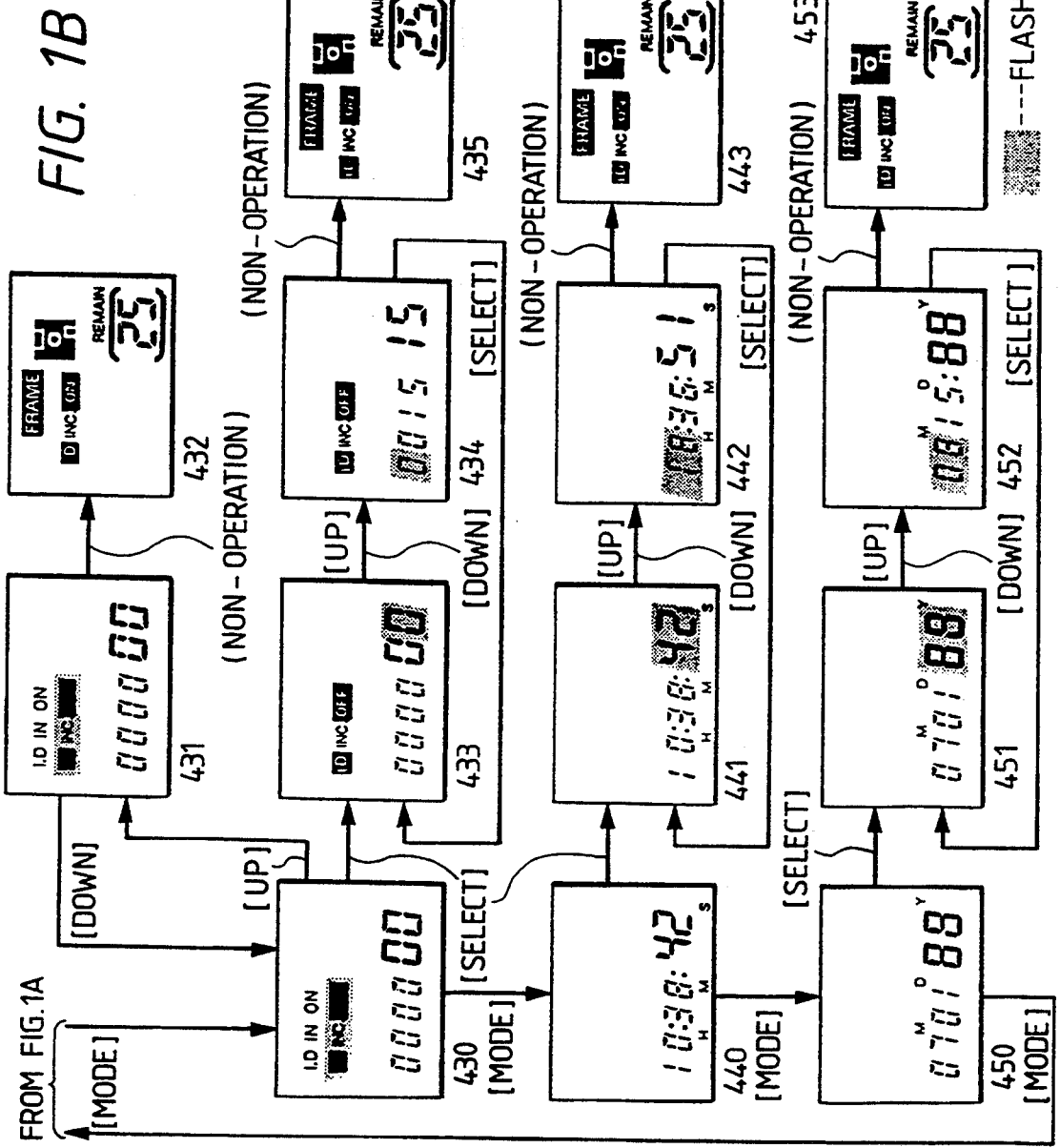

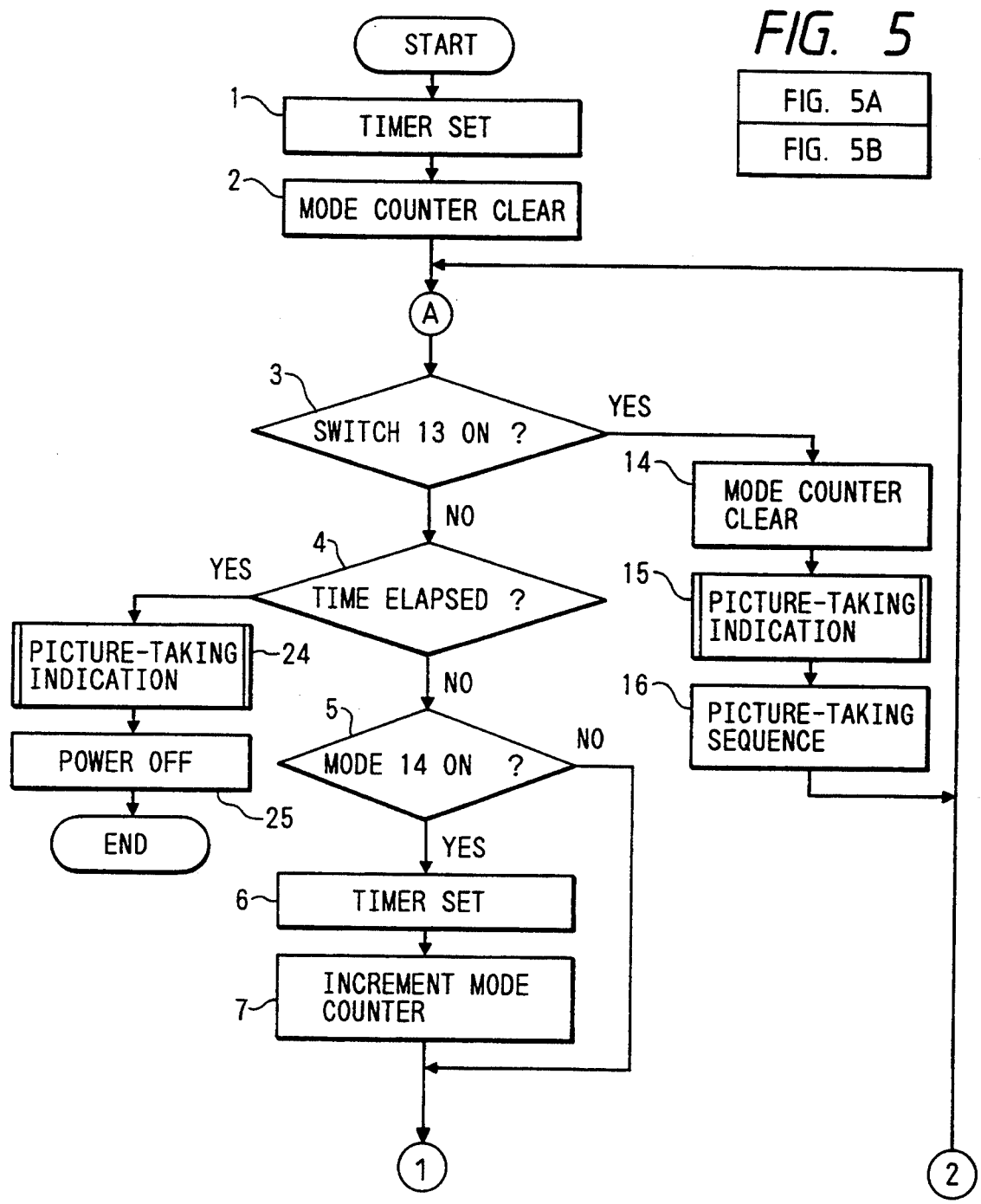

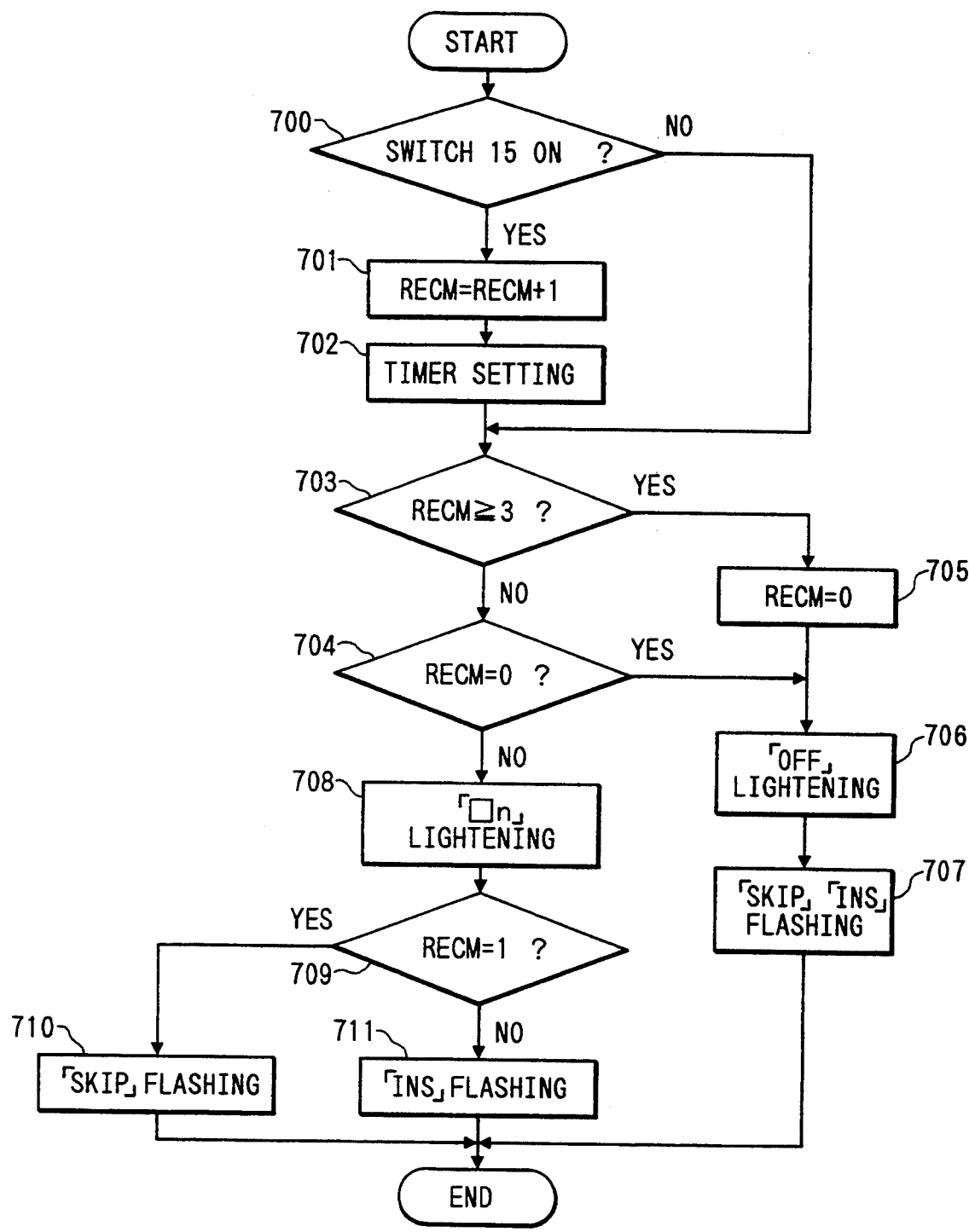

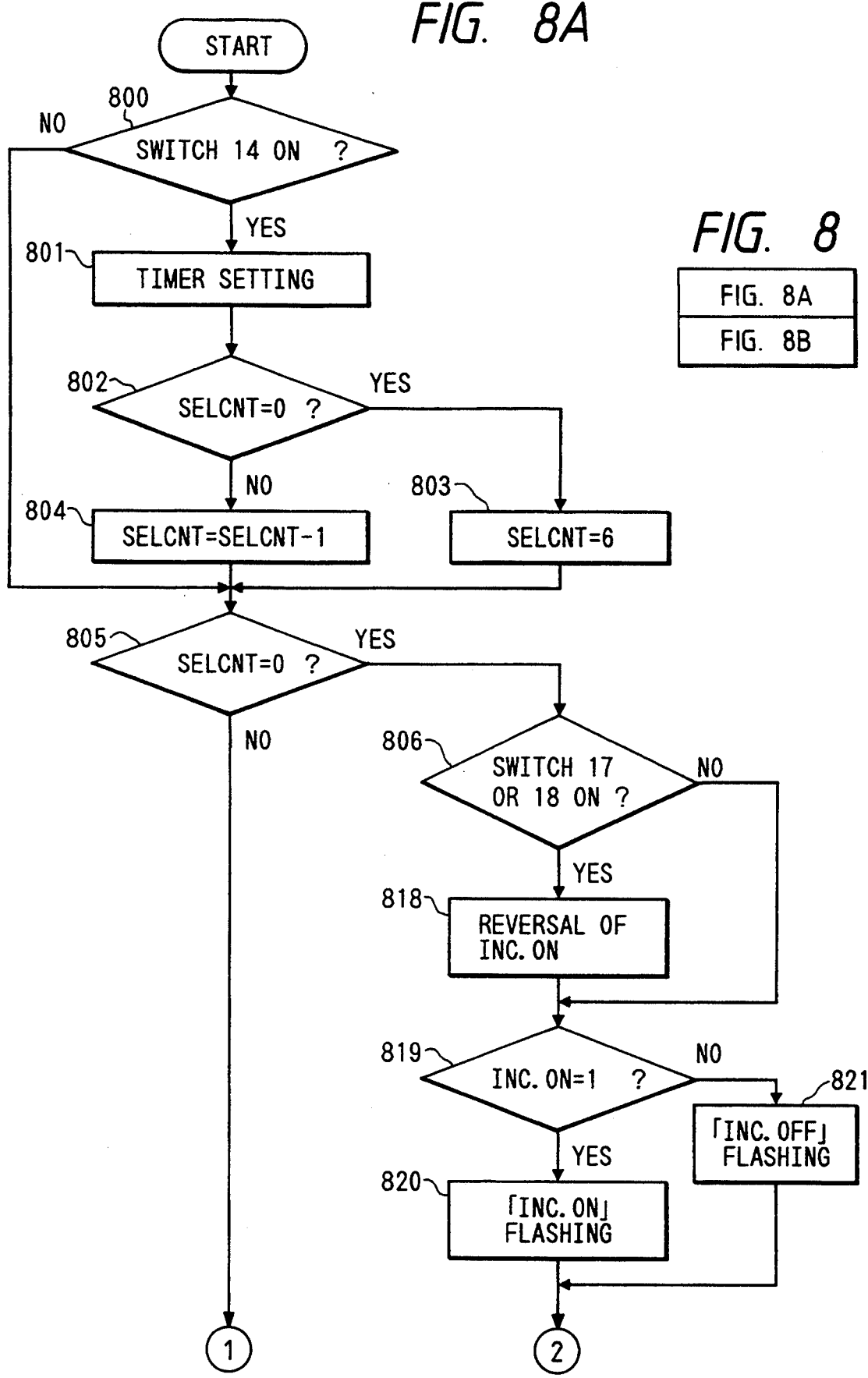

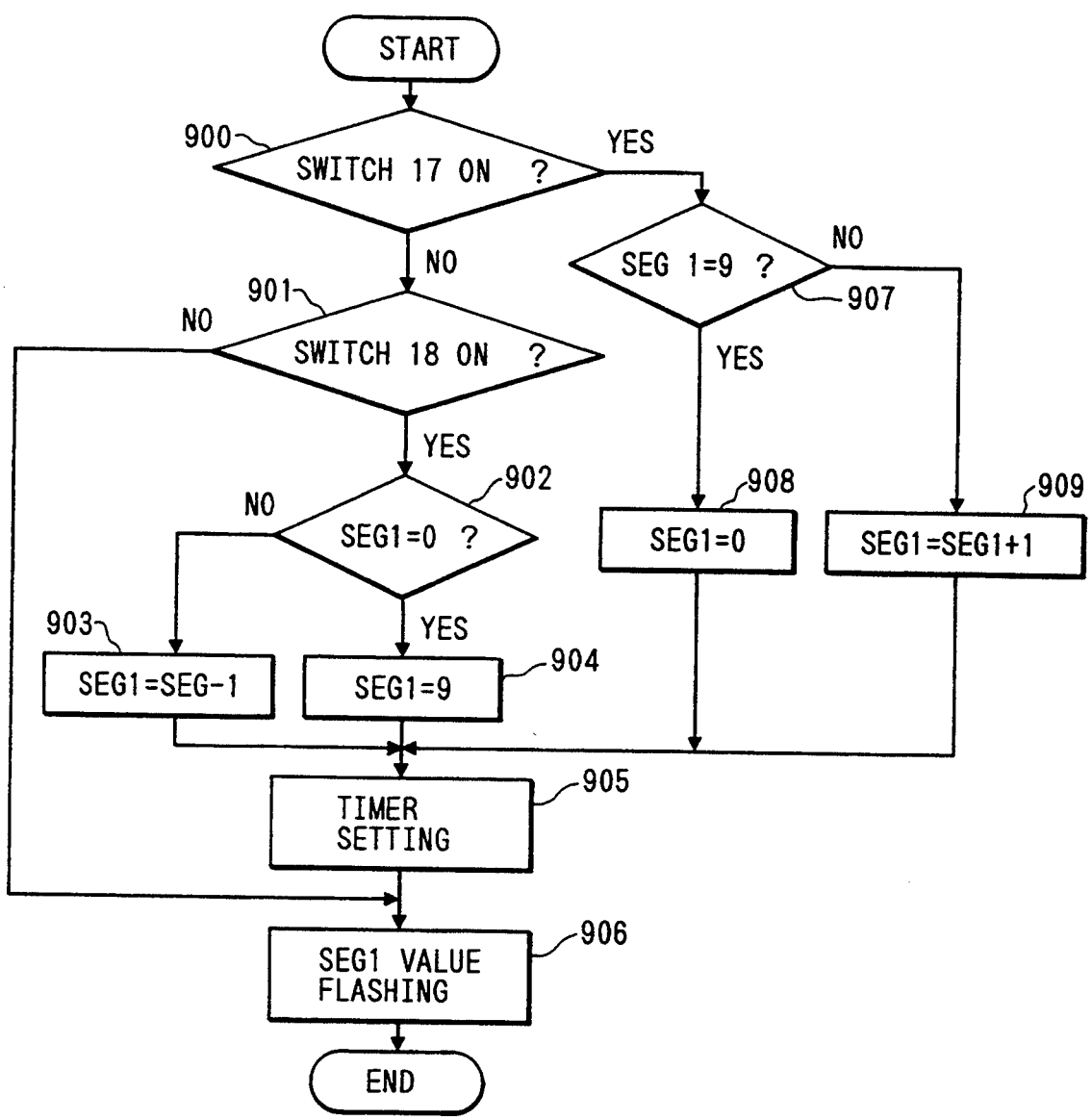

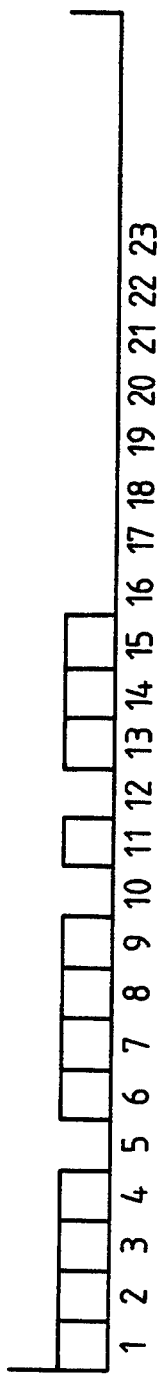
FIG. 23-I
FIG. 23-II
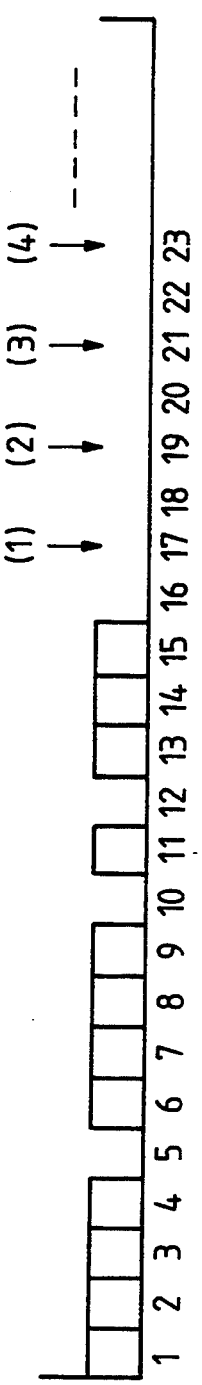
FIG. 23-III
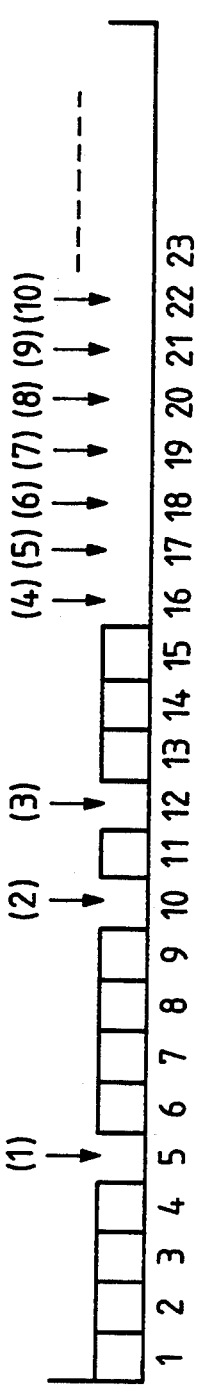
FIG. 23-IV

DISPLAY DEVICE HAVING A PLURALITY OF DISPLAY MODES

This application is a continuation, of application Ser. No. 07/371,082 filed Jun. 26,1989, now abandoned.

BACKGROUND OF THE INVENTION

1. Field of the Invention

The present invention relates to a display device, and more particularly to a display device capable of displaying various information for recording.

2. Related Background Art

A conventional example of such a display device is the display device for an electronic still camera. In certain electronic still cameras the following values can be set: the exposure correction value, ID number, clock, date, etc. as shown in FIG. 4, in which a cursor 100 for setting the exposure correction value is shown. The exposure correction setting is indicated, as shown in FIG. 4, by exclusive display segments. The segments $\frac{1}{4} \cdot \frac{1}{2} \cdot 1 \cdot 2 \cdot 4$ are used for indicating the exposure correction, and the selected number is indicated by the cursor 100, and the selected value can be varied by moving said cursor 100 to a desired position with unrepresented up and down switches.

However, the use of such exclusive display segments for the exposure correction values complicates the display or renders the display smaller, thus reducing the legibility thereof.

Stated differently, the electronic still camera requires the display of various information such as the number of images taken and the mode photographing in addition to the exposure correction value, and all these data can not be incorporated in a limited space.

Also, the increase in the number of display segments complicates the electric wiring, thus resulting in shortage of space for circuitry and an increase in the cost of the display driver integrated circuit.

In addition, there is been much room for improvement in achieving an effective display for the amount of recording capacity left on the recording medium, or the plural recording modes.

Such drawbacks are also present in a camera utilizing conventional silver halide-based photographic film or a video tape recorder utilizing a magnetic tape.

SUMMARY OF THE INVENTION

In consideration of the foregoing, an object of the present invention is to provide a display device of simple structure which improved the legibility of the display.

Another object of the present invention is to provide a display device capable of displaying a number of recording modes with a limited number of display elements.

The above-mentioned objects can be attained, according to a preferred embodiment of the present invention, by a display device provided with display means, exposure correction means, and control means having a first mode for causing said display means to display correction information obtained by said correction means, and a second mode for displaying either time information or an ID number instead of said correction information.

Still another object of the present invention is to provide a display device adapted for use in a recording apparatus for recording image signals.

Still another object of the present invention is to provide a display device adapted for use in a still video recording apparatus.

Still other objects of the present invention, and the advantages thereof, will become fully apparent from the following description of the embodiments thereof to be taken in conjunction with the attached drawings.

BRIEF DESCRIPTION OF THE DRAWINGS

FIGS. 1A, 1B and 21 are views showing the display states of an embodiment of the present invention;

FIGS. 5 to 20 are flow charts showing the functions of a control circuit 5 shown in FIG. 2;

FIGS. 23-I to 23-IV are views showing the function in a SKIP mode, a NORMAL mode and an INSERT mode of the device of the embodiment.

DESCRIPTION OF THE PREFERRED EMBODIMENTS

Now, the present invention will be clarified in detail by an embodiment thereof applied to an electronic still video camera.

More specifically, there is disclosed a display device of improved convenience of use, in which the display segments for the exposure correction value are utilized also for other displays, and, at the setting of the exposure correction value, the display is so switched as to indicate only the exposure correction value for better legibility, and, in case of displaying plural display frames, the exposure correction value is shown in the first frame for the convenience of the user.

Figure 2:
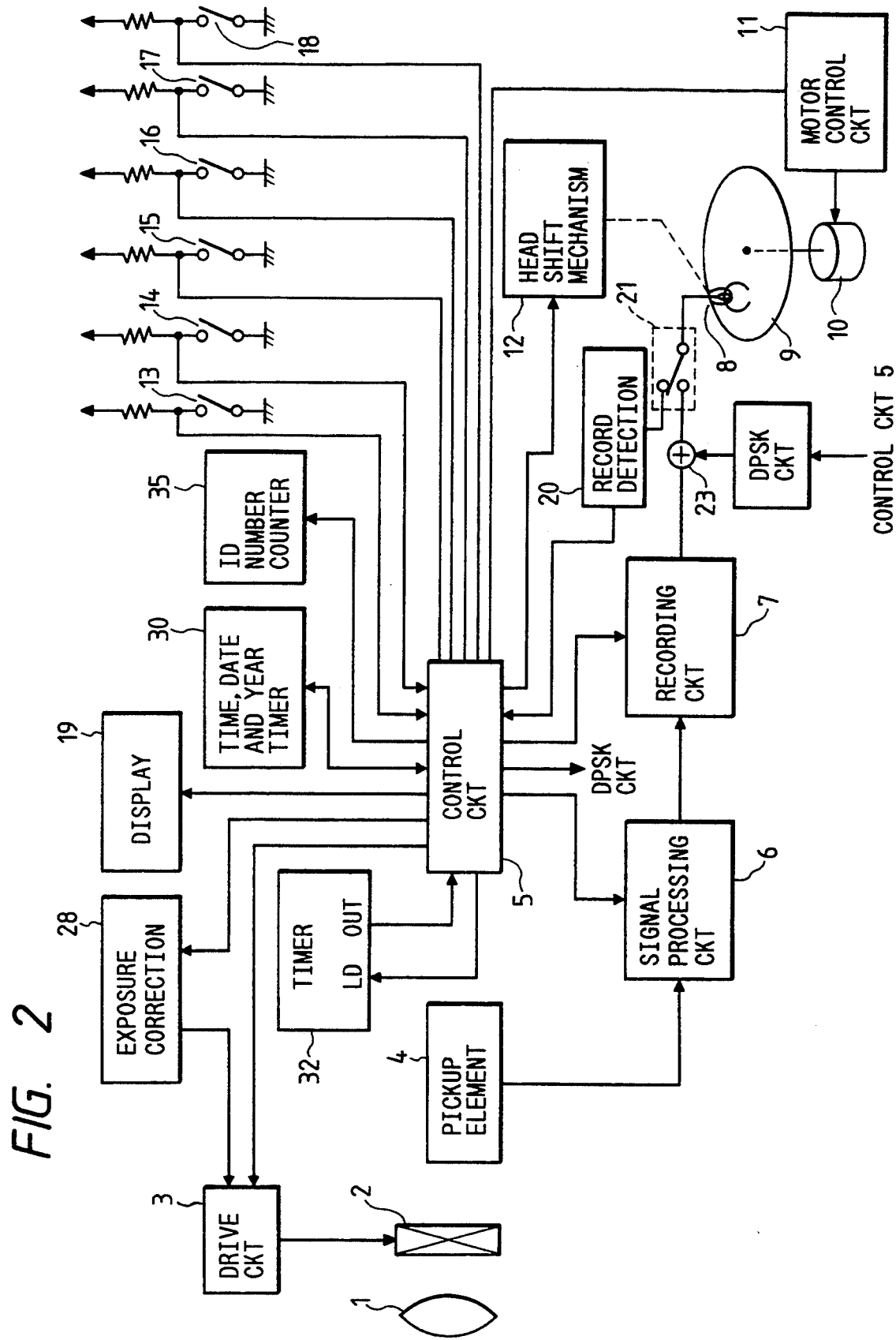
FIG. 2 is a block diagram of said embodiment.

FIG. 2 is a block diagram of an embodiment of the present invention, wherein shown are a photographing lens 1; an exposure control member 2 such as a diaphragm; a drive circuit 3 for said exposure control member 2; an image pickup device 4 such as a CCD; a control circuit 5 for controlling the entire system; a signal processing circuit 6 for effecting gamma correction, blanking, addition of synchronization signals etc. to the output signal from the image pickup 4; a recording circuit 7 for effecting modulation etc. on the output signal of the signal processing circuit 6 for obtaining a signal form suitable for recording on a magnetic sheet; a magnetic head 8; a magnetic sheet 9 such as a video floppy disk; a motor 10 for rotating the magnetic sheet 9; a motor control circuit 11 for controlling the rotation of the motor 10; a head shift mechanism 12 for changing the recording track by shifting the magnetic head 8 in the radial direction of the magnetic sheet; a record trigger switch 13 for starting the photographing operation; a mode switch 14 for switching the displayed frame at the switching of the photographing mode; a selector switch 15 for selecting the setting item in the displayed frame; a frame/field selector switch 16 for selecting either frame recording or the field recording; an UP-switch 17; a DOWN-switch 18; and a display unit 19 for displaying, for example, the photographing mode.

There are further provided a record detection circuit 20 for detecting the presence or absence of the recorded signals on each of concentric tracks on the magnetic sheet 9, from the output of the magnetic head 8; a switch circuit 21 for connecting the head 8 either to the detection circuit 20 or to an adder 23; and a DPSK circuit 27 for effecting DPSK modulation on the data supplied from the control circuit 5. Said data are 4-digit numeral data recorded together with the image data, indicating the ID number to be explained later, time, date or exposure correction data.

An exposure correction circuit 28 corrects the drive circuit 3 for driving the exposure control member 2, according to the set exposure correction data. A timer 30, for counting and displaying date and time, is provided therein with registers respectively corresponding to year, month, date, hour, minute and second, the data of which are changed according to the instructions from the control circuit 5. A timer 32 is employed, for loading the count supplied from the control circuit 5, in the control sequences to be explained later. Timer 32 is also used for automatically returning the display state to a predetermined state when the switches 13-18 are not manipulated over a predetermined period of time. Another counter 35 is provided for counting the 4-digit ID number.

Figure 3:
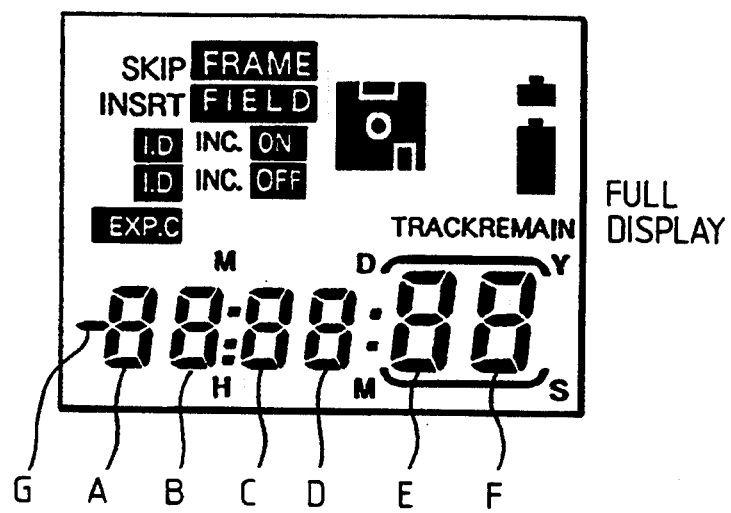
FIG. 3 is a view of all the display segments of a display unit 19.

The display unit 19, composed of a liquid crystal display, has a structure shown in FIG. 3, in which all the display segments are turned on.

As shown in FIG. 3, the present embodiment employs six digits (A-F) of ordinary 7-segment numeral display blocks, with an eighth segment as a block G attached to the left-end block.

There are further provided segments ":" and "." between the second block B and third block C; a segment ":" between the fourth block D and fifth block E; segments "M" and "H" respectively at the upper and lower right of the second block; segments "D" and "M" respectively at the upper and lower right of the fourth block; and segments "Y" and "S" respectively at the upper and lower right of the sixth block.

Also, segments "☐" are provided above and below the fifth and sixth blocks, and segments "TRACK" and "REMAIN" are provided above said segment "⊓"

Figure 22:
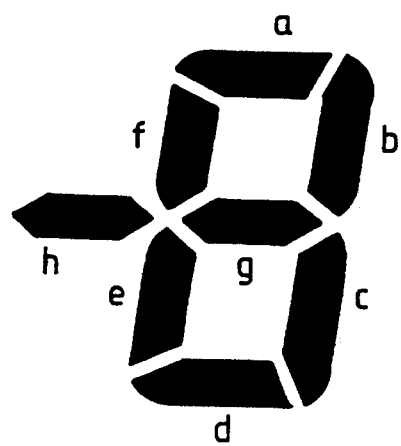
FIG. 22 is a magnified view of display segments A-F and G shown in FIG.3.

The details of the display segments of the blocks A-F and G are shown in FIG. 22.

In the following there will be explained the functions of the present embodiment, with reference to the examples of the display shown in FIG. 1 and flow charts shown in FIGS. 5 to 20.

At first, a step 1 sets a POWER OFF timer at an initial value in order to automatically cut off the power supply if the switches are not actuated over a predetermined period of time.

Said timer may be composed either of hardware or software.

Then, a step 2 clears a mode counter, for counting the number of actuations of the mode switch 14, to zero. Said mode counter may be composed of a register or a memory area.

Then, a step 3 discriminates whether the photographing switch 13 is turned on. If turned on, a step 14 clears the mode counter to zero, then a step 15 effects a display for ordinary photographing (400 in FIG. 1), and a step 16 executes a photographing sequence. This photographing sequence is not the object of the present invention, and will therefore be explained only briefly. Said sequence consists of receiving the image of an object, under the control of the exposure control member 2 such as a shutter, with the image pickup device 4, processing the output signal thereof with the signal processing circuit 6, modulating the output signal thereof with the recording circuit 7 and recording the output signal thereof on the rotating magnetic sheet 9 through the head 8. After the execution of the step 16 the sequence returns to a point (A).

If the step 3 identifies that the photographing switch 3 is off, a step 4 discriminates whether the POWER OFF timer has counted the predetermined time, and, if counting has been completed, a step 24 provides a display for picture taking, and a step 25 cuts off the power supply.

On the other hand, if the count of the timer has not reached the predetermined value, a step 5 discriminates whether the mode switch is on or not. If it is off, the sequence proceeds to a step 8. If it is on, a step 6 resets the POWER OFF timer, thus extending the time to the automatic cut-off of the POWER OFF timer. Then a step 7 effects an increment by one of the count of the mode counter. Then a step 8 discriminates the count of said mode counter, and, if it is "6", a step 17 clears said counter to zero and a step 18 provides a display for ordinary photographing, as shown by 400 in FIG. 1a. Then the sequence returns to (A).

If the count of the mode counter is identified as "0" in a step 9, the sequence proceeds to a step 18, and the sequence thereafter returns to (A) as in the case of "0" count of the mode counter.

Also, if the count of the mode counter is identified as "1" in a step 10, a step 19 executes an exposure correction setting routine to be explained later, and the sequence thereafter returns to (A). If said count is identified "2" in a step 11, a step 20 executes a recording mode setting routine, and the sequence returns to (A). If said count is identified as "3" or "4" in a step 12 or 13, a step 21 or 22 respectively executes an ID setting routine or a clock setting routine, and the sequence returns to (A). If said count is "5", a step 23 executes a calendar setting routine and the sequence returns to (A).

Figure 6:
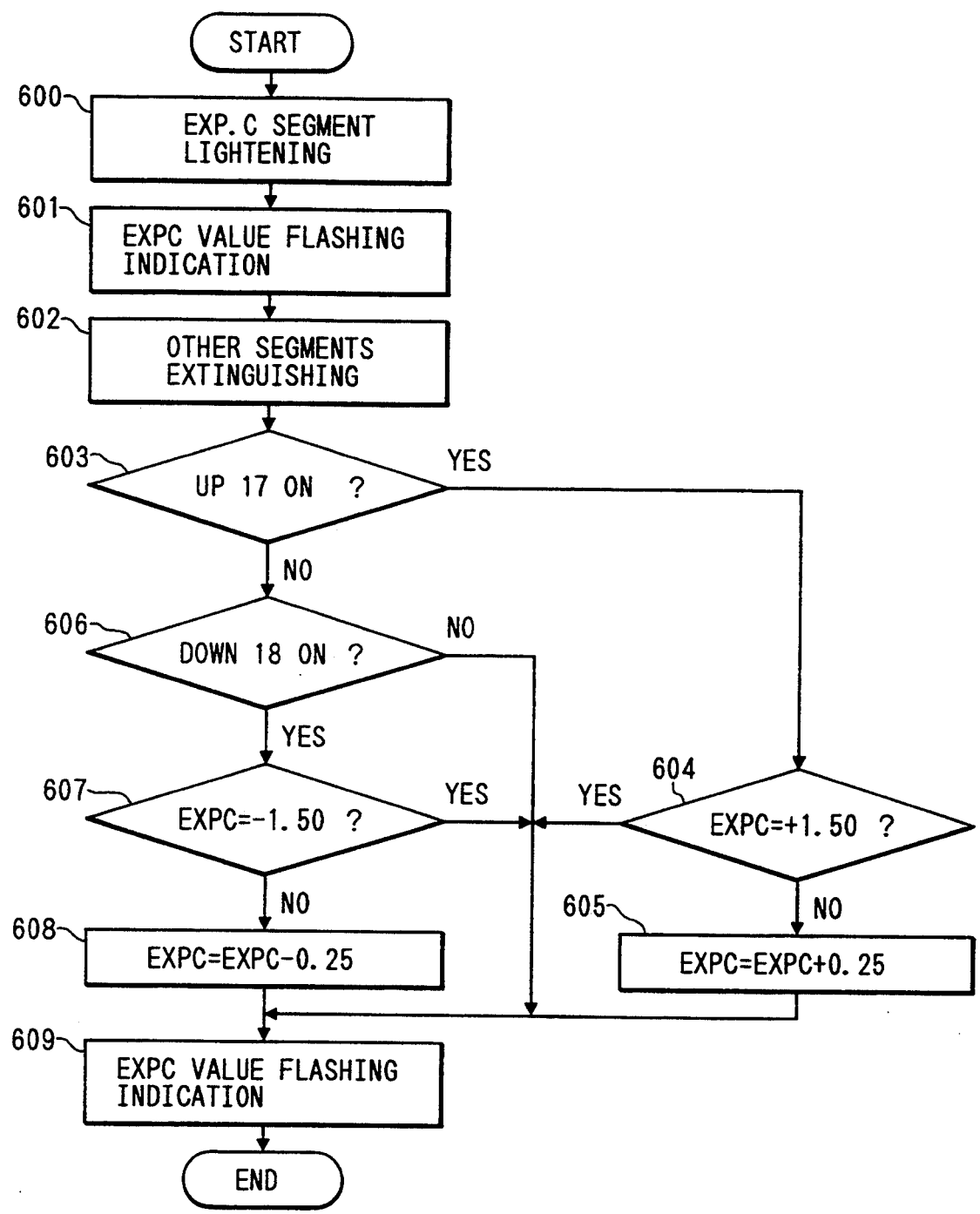

The details of the exposure correction setting routine of the step 19 are shown in FIG. 6. At first a step 600 turns on a segment EXPC shown in FIG. 3. Then a step 601 displays polarity with either "+" with the segments e, f, g, h shown in FIG. 22, or "−" with the segments g, h, according to the current correction value.

Also, the display blocks of second, third and fourth digits display the current exposure correction value in flashing mode. In the following description, this value is referred to as the EXPC value, which is labelled as EXPC in the software of the microprocessor of the control circuit 5.

Then a step 602 turns off all the display segments, except the EXPC segment and the segments of the first to fourth digits, thereby clarifying the data to be set in this state.

A step 603 discriminates whether the UP-switch 17 has been actuated, and, if actuated, a step 604 discriminates whether the current EXPC value is at least equal to +1.50. If not, a step 605 adds 0.25 to the EXPC value, and the sequence proceeds to a step 609. If the EXPC value is identified at least equal to +1.50 in the step 604, the sequence immediately proceeds to the step 609.

If the step 603 identifies that the UP-switch 17 has not been actuated, a step 606 discriminates whether the DOWN-switch 16 has been actuated, and, if actuated, a step 607 discriminates whether the current EXPC value is equal to −1.50 at maximum. If so, the sequence proceeds to the step 609, but, if not, a step 609 subtracts 0.25 from the current EXPC value, and the sequence proceeds to the step 609.

If the step 606 identifies that the DOWN-switch 16 has not been actuated, the sequence directly proceeds to the step 609. Said step 609 displays the EXPC value in flashing mode.

Figures 1, 1A, 1B:
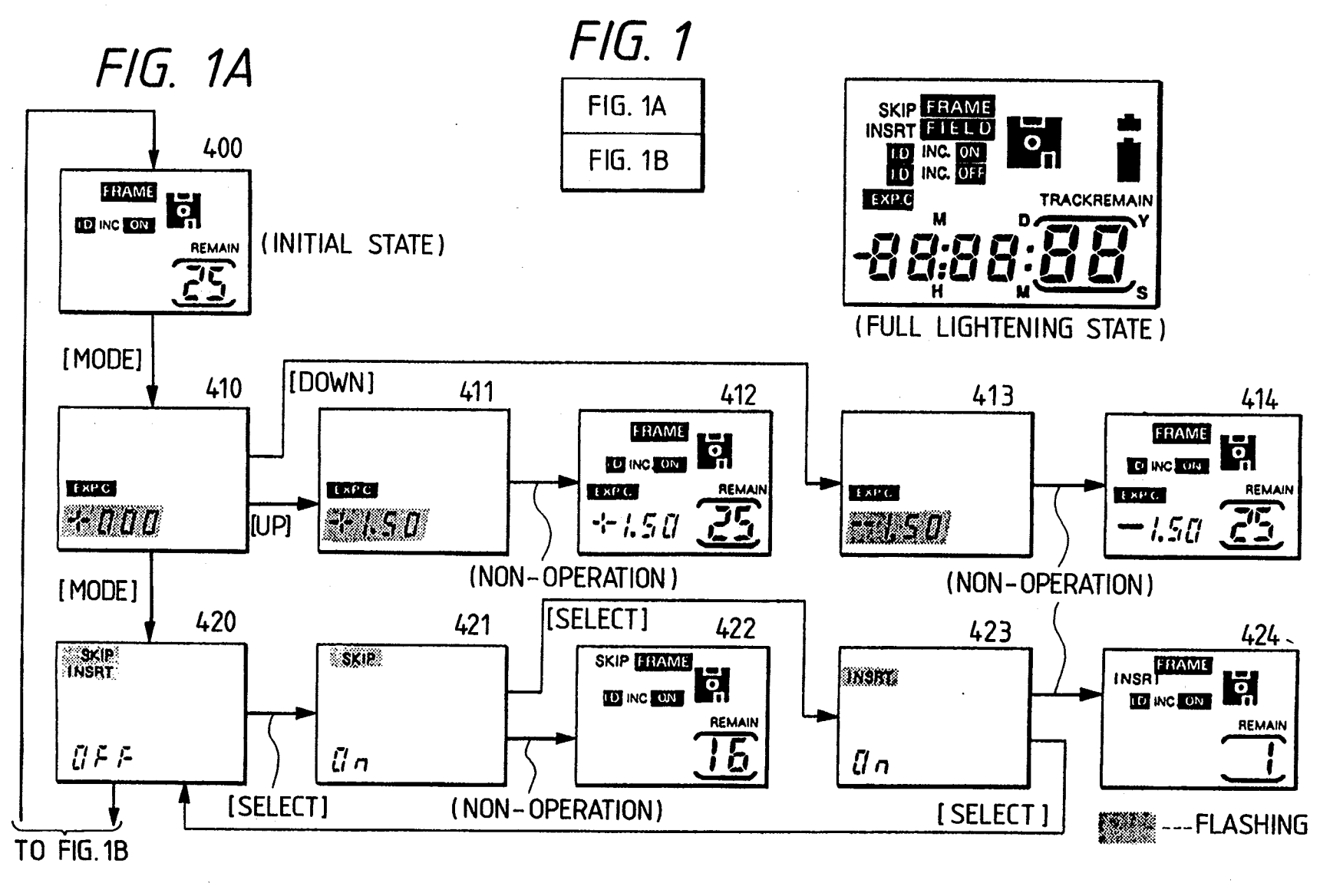

Thus there is obtained a display shown, for example, in 411 or 143 in FIG. 1A.

Figure 5B:
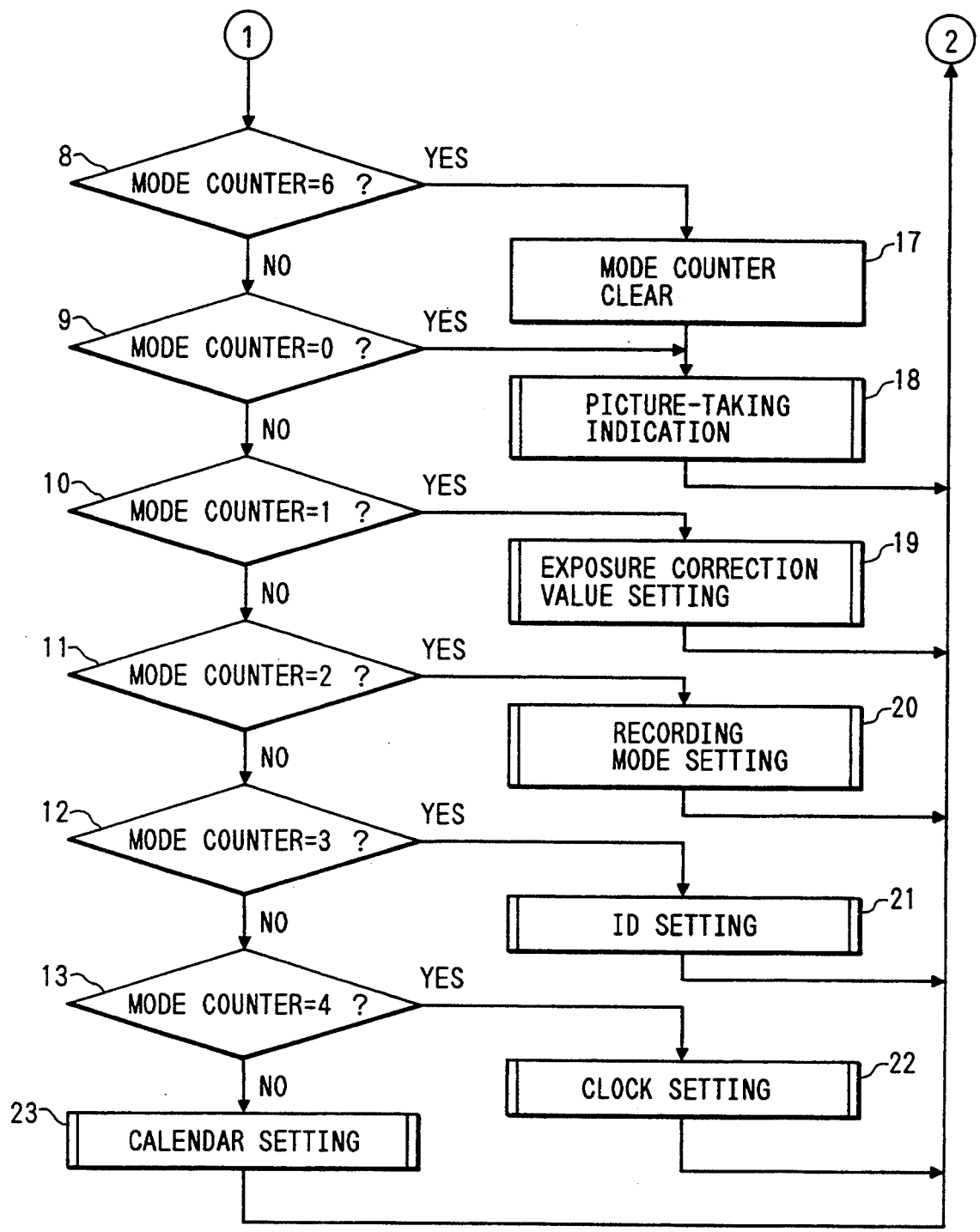

FIG. 7 shows the details of the recording mode setting routine of the step 20 in FIG. 5. The present embodiment is provided with three recording modes, called NORMAL mode, SKIP mode and INSERT mode, which will be explained in the following with reference to FIG. 23.

FIG. 23-I shows an example of the presence and absence of records on 50 concentric tracks formed on the magnetic sheet 9, wherein the numbers indicate the tracks numbered in serial manner from the outer periphery of the magnetic sheet 9. In the example shown in FIG. 23-I, tracks 1-4, 6-9, 11 and 13-15 are already recorded while tracks 5, 10, 12, 16 and thereafter are still empty.

In the above-mentioned NORMAL mode, the recording is made on the outermost one of the empty tracks if they have no recorded tracks in the inner side. Thus, in the example shown in FIG. 23-II, the recording is at first made on a track 16 (indicated as (1)), then on a track 17 (indicated as (2)), and so forth.

In the SKIP mode, the recording is made in a sequence similar to that in the NORMAL mode but in such a manner that an empty track always precedes the track to be recorded, as shown in FIG. 23-III. In this mode there is secured an area for recording an signal corresponding to the already recorded image signal. Thus, this mode secures an area for recording, for example, an audio signal corresponding to the already recorded image signal.

In the INSERT mode, the recording is made in succession on the outermost one of the empty tracks on the magnetic sheet 9, as shown in FIG. 23-IV.

Said INSERT mode is provided in order to fill the empty tracks formed in the recording of the SKIP mode.

For achieving various recording modes explained above, it is necessary to discriminate the recorded and empty tracks on the magnetic sheet 9. For this purpose, in the present embodiment, there are provided the record detection circuit 20 and the switch circuit 21 for connecting the head 8 either to the recording circuit 7 or said detection circuit 20.

The function of the recording mode setting routine shown in FIG. 7 is as follows. At first a step 701 increases the count of a memory RECM storing the currently selected recording mode, by one. Then a step 702 renews the setting of the POWER OFF timer, and the sequence proceeds to a step 703. On the other hand, if a step 700 identifies that the selector switch 15 is off, the sequence directly proceeds to the step 703.

The step 703 discriminates whether the count of said memory RECM is at least equal to "3", and, if so, a step 705 resets said memory RECM to zero and the sequence proceeds to a step 706. If said count is "0", "1" or "2", the sequence proceeds to a step 704, and, if it is "0", the sequence then proceeds to a step 706.

The step 706 displays "OFF" by the first, second and third digits of the 7-segment blocks, and a step 707 simultaneously flashes the segments "SKIP" and "INSERT", as shown in 420 in FIG. 1A. This indicates that neither of the SKIP and INSERT modes has been set and either mode may be set. Thereafter the sequence returns to (A).

Figure 4:
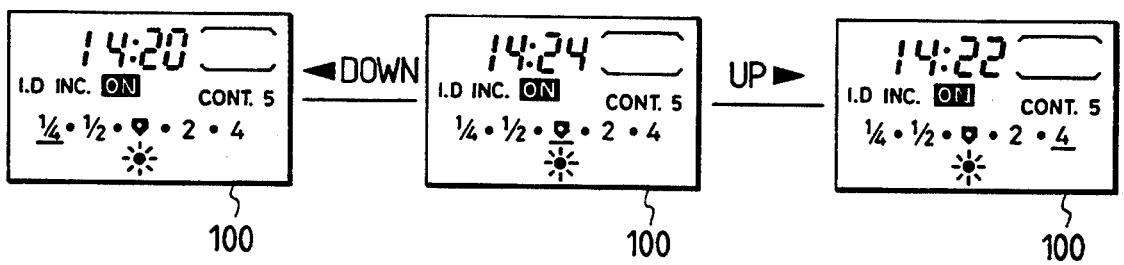
FIG. 4 is a view of an example of a conventional display device.

If the step 704 identifies that the count of the memory RECM is not "0", a step 708 displays "On" in the first and second digits. Then a step 709 discriminates whether said count is "1", and, if so, a step 710 displays the segment "SKIP" in flashing mode (421 in FIG. 1), indicating the setting of the SKIP mode. Thereafter the sequence returns to (A). If said count is not "1" in the step 709, a step 711 flashes the segment INSRT (423 in FIG. 4), indicating that the INSERT mode has been selected. Thereafter the sequence returns to (A).

Figure 8B:
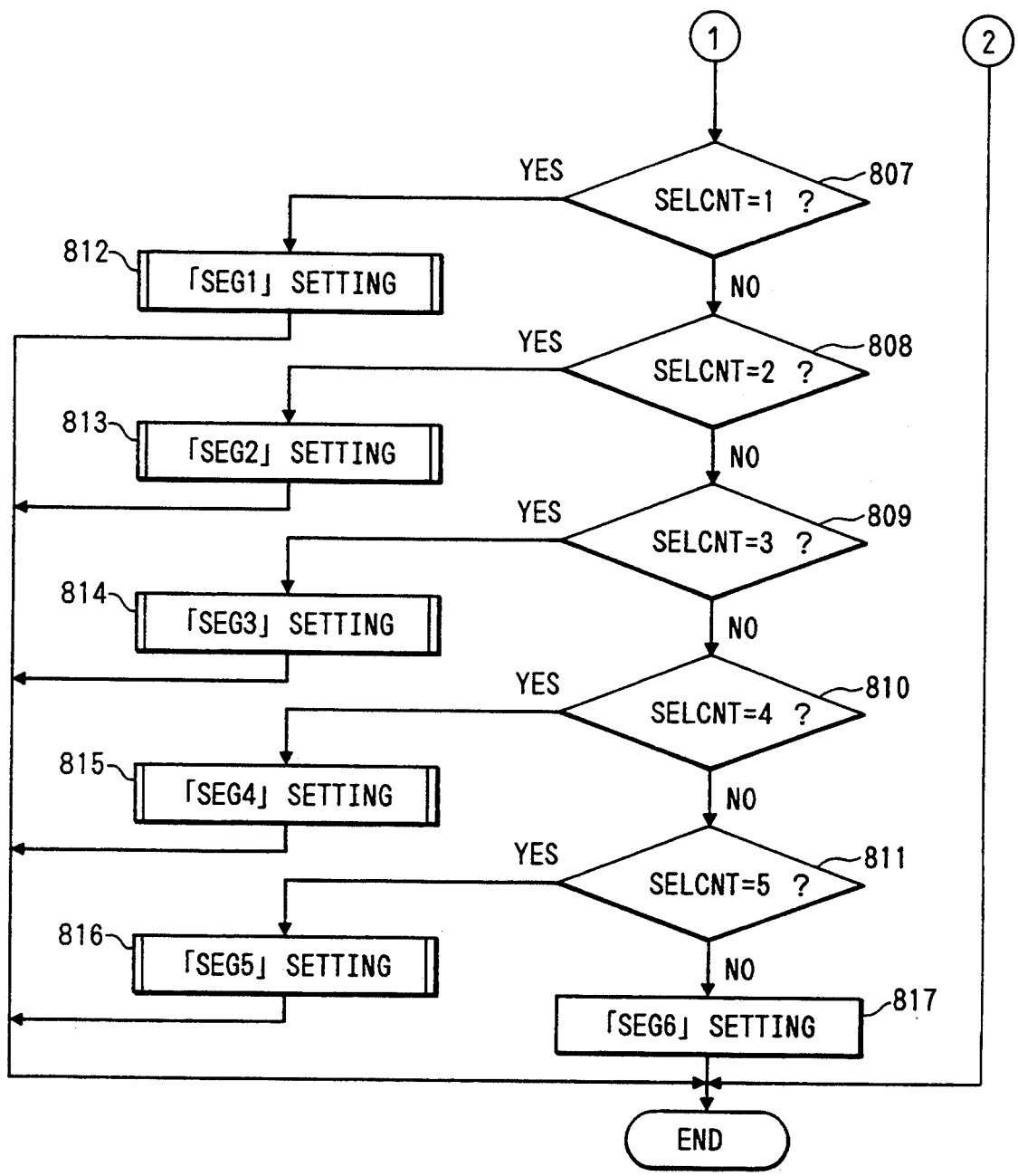

Now reference is made to FIG. 8 for explaining the setting of the ID number, which is a 4-digit number modulated for example by the DPSK circuit and recorded on each track of the magnetic sheet 9 together with the image signal. Said number can be automatically increased stepwise at each photographing operation.

The setting of said ID number can be made as follows. At first a step 800 discriminates whether the switch 14 has been actuated. If actuated, a step 801 renews the count of the POWER OFF timer, and a step 802 discriminates whether the count of a counter SELCNT for counting the number of actuations of the selector switch 14 is zero. If said count is "0", a step 803 shifts said count to "6" and the sequence proceeds to a step 805. If said count is not "0", a step 804 reduces said count by one, and the sequence proceeds to the step 805. Also if the step 800 identifies that the switch 14 has not been actuated, the sequence immediately proceeds to the step 805. Said step 805 discriminates whether the count of the counter SELCNT is "0", and the sequence proceeds to a step 806 or 807 respectively if said count is "0" or not. The step 806 discriminates whether the UP-switch 17 or the DOWN-switch 18 has been actuated, and, if actuated, a step 818 inverts the value, from "0" to "1" or from "1" to "0", of a memory ID INC storing whether the automatic renewal mode of the ID number has been selected. Then a step 819 discriminates the count of said memory ID INC, and, if it is "1", a step 820 flashes segments "ID INC ON" as shown in 431 in FIG. 1A. If it is "0", a step 821 flashes segments "ID INC OFF" as shown in 430 in FIG. 4. Then the sequence returns to (A).

Then, according to the count of the memory SELCNT, the sequence proceeds from a step 807, 808, 809, 810 or 811 to a step 812, 813, 814, 815, 816 or 817. The step 812, 813, 814, 815, 816 or 817 executes a display routine of the 7-segment numeral block of a digit corresponding to the count of SELCNT, for example that of the first or second digit if said count is "1" or "2" respectively.

The steps 812, 813, 814, 815, 816 and 817 are identical except the position of the digit. Therefore there will be explained, in the following, the routine for activating the segments of the first digit, with reference to FIG. 9.

At first a step 900 discriminates whether the UP-switch has been actuated, and, if actuated, a step 907 discriminates whether the count of a memory SEG1, storing the value of the first digit, is "9". If so, a step 908 sets the memory SEG1 to "0". If not, a step 909 increases said count by one. Then the sequence proceeds to a step 905.

If the step 900 identifies that the UP-switch 17 has not been actuated but a step 901 identifies that the DOWN-switch 18 has been actuated, a step 902 discriminates whether the count of the memory SEG1 is "0". If it is "0", a step 904 sets the SEG1 at "9", but, if it not "0", a step 903 reduces the count of the SEG1 by one.

The step 905, to be executed when the UP- or DOWN-switch has been actuated, renews the count of the POWER OFF timer and the sequence proceeds to a step 906. Also the sequence directly proceeds to the step 906 if the step 901 identifies that neither the UP-switch nor the DOWN-switch has been actuated. The step 906 flashes the value of the SEG1, as shown in 433 in FIG. 1B.

Also in the steps 813, 814, 815, 816 and 817, the values of other digits are displayed in flashing mode, utilizing memories SEG2, 3, 4, 5 and 6. During the setting operation of the ID number, only the digit being set is made to flash, while other digits are continuously turned on (cf. 430–435, FIG. 1), though a detailed explanation is omitted.

Figure 10:
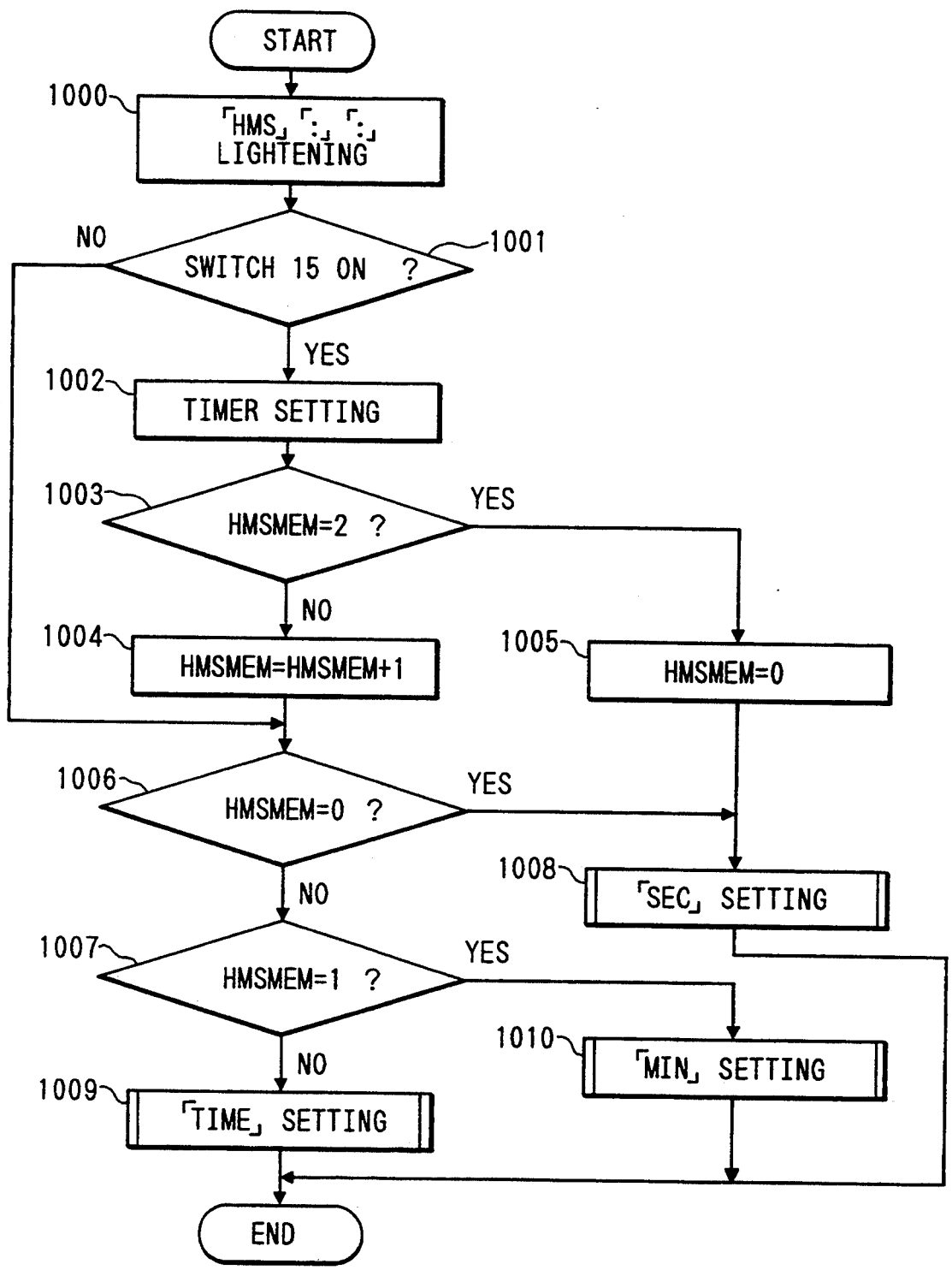

FIG. 10 shows the details of the clock setting routine of the step 22 in FIG. 5.

At first a step 1000 turns off segments HMS signifying hour, minute and second as shown in 440 in FIG. 1B, and also turns on segments ":" respectively between the second and third digits, and between the fourth and fifth digits.

Then a step 1001 discriminates the state of the selector switch 15, and, if it is on, a step 1002 renews the count of the POWER OFF timer and the sequence proceeds to a step 1003. If it is off, the sequence proceeds to a step 1006. The step 1003 discriminates whether the count of a memory HMSMEM, storing the setting of hour, minute or second, is "2". If it is "2", a step 1005 sets the memory HMSMEM at "0", and the sequence proceeds to a step 1008. If it is not "2", a step 1004 increases the count of the HMSMEM by one, and the sequence proceeds to the step 1006.

Thereafter the sequence proceeds from a step 1006 or 1007 to a "second" setting routine of a step 1008, a "minute" setting routine of a step 1010 or an "hour" setting routine of a step 1009, respectively, if the count of HMSMEM is "0", "1" or "2".

These routines will be explained in the following.

Figure 11:
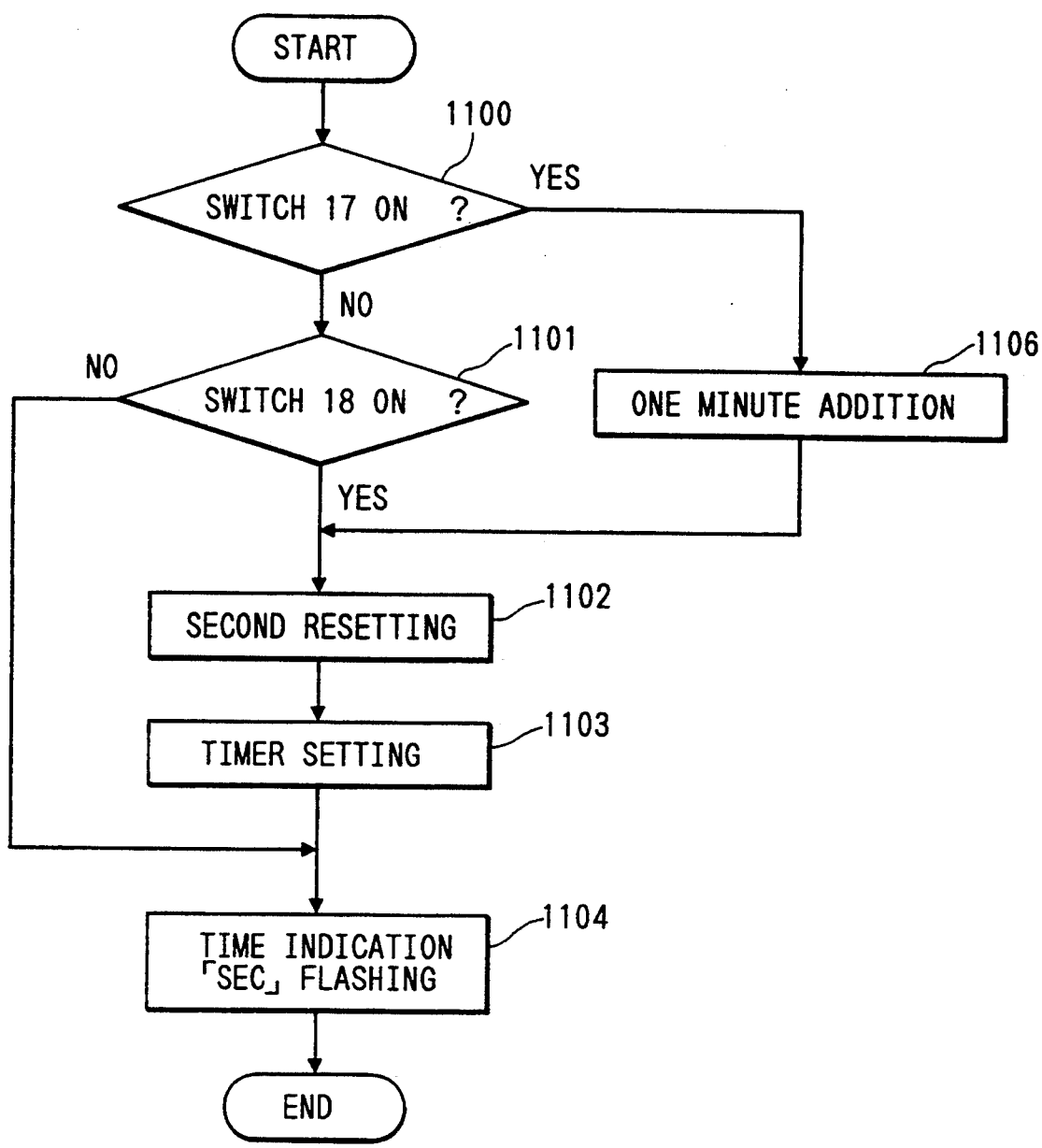

The second setting routine is conducted according to a flow chart shown in FIG. 11.

At first a step 1100 discriminates the state of the UP-switch 17, and, if it is on, a step 1106 adds one minute to the clock circuit 30 and the sequence proceeds to a step 1102. If said switch is off, a step 1101 discriminates the state of the DOWN-switch 18, and the sequence proceeds to a step 1102 or 1104 respective if it is on or off.

The step 1102 resets the count of seconds of the clock to zero, and a step 1103 then renews the count of the POWER OFF timer.

Then the step 1104 displays the time in the first to sixth digits of the 7-segment numeral blocks, with the "second" display in the fifth and sixth digits in the flashing mode, as shown in 441 in FIG. 1B.

Figure 12:
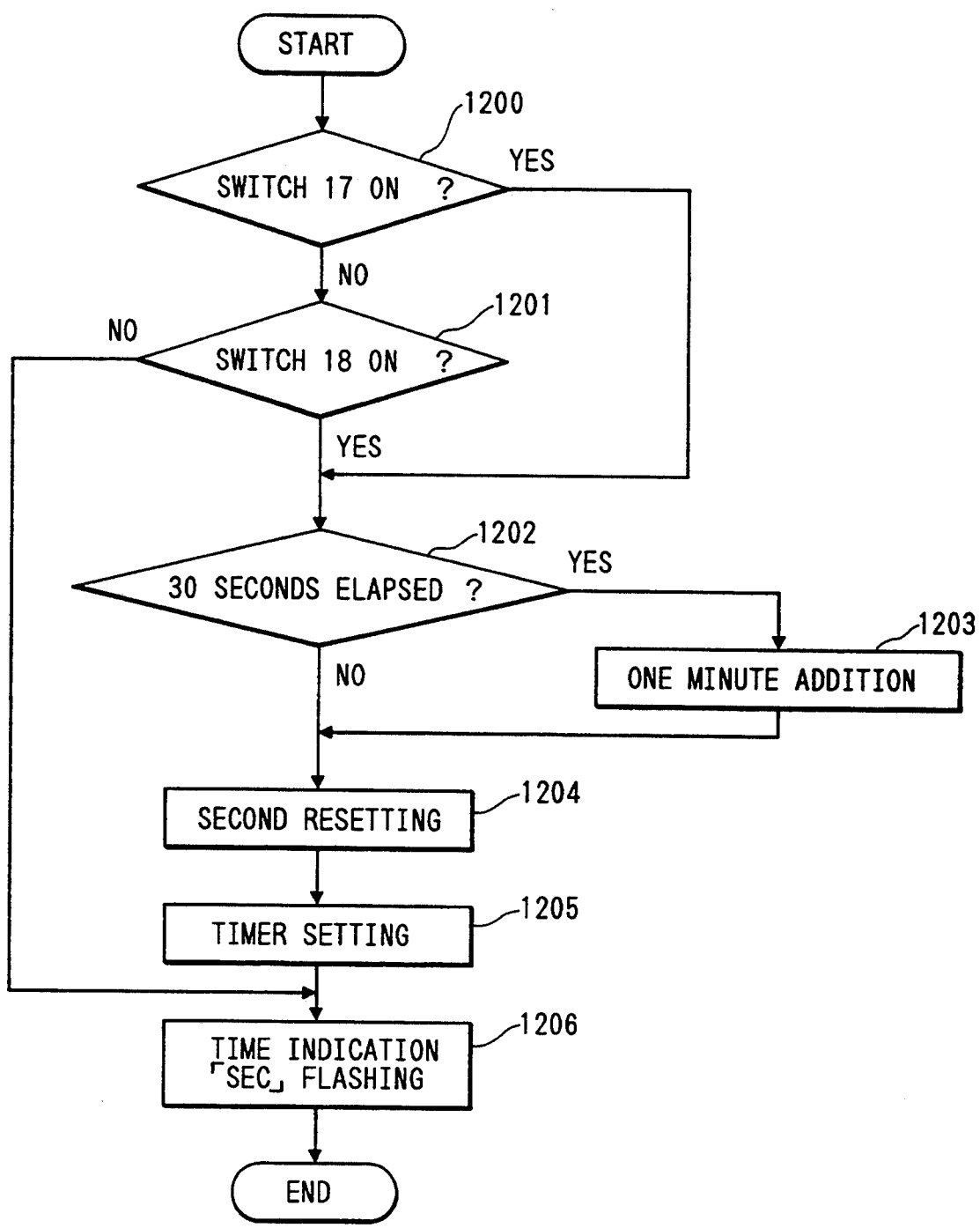

FIG. 12 is a flow chart of another embodiment of "second" setting.

In this embodiment, at the actuation of the UP- or DOWN-switch, if the count of seconds exceeds 30 seconds, 1 minute is added simultaneously with the resetting of seconds, but, if said count does not exceed 30 seconds, there is merely conducted the resetting of seconds.

At first if a step 1200 or 1201 identifies the actuation of the UP- or DOWN-switch, the sequence proceeds to a step 1202.

The step 1202 discriminates the count of seconds, and, if it exceeds 30 seconds, a step 1203 adds one minute to the clock, and the sequence proceeds to a step 1204. If not, the sequence proceeds directly to the step 1204.

The step 1204 resets the count of seconds, and a step 1205 renews the count of the POWER OFF timer.

On the other hand, if neither the UP- nor the DOWN-switch has been actuated, the sequence proceeds to a step 1206.

The step 1206 displays the current time of the clock, with a flashing display of seconds. Then the sequence returns to (A).

Figure 13:
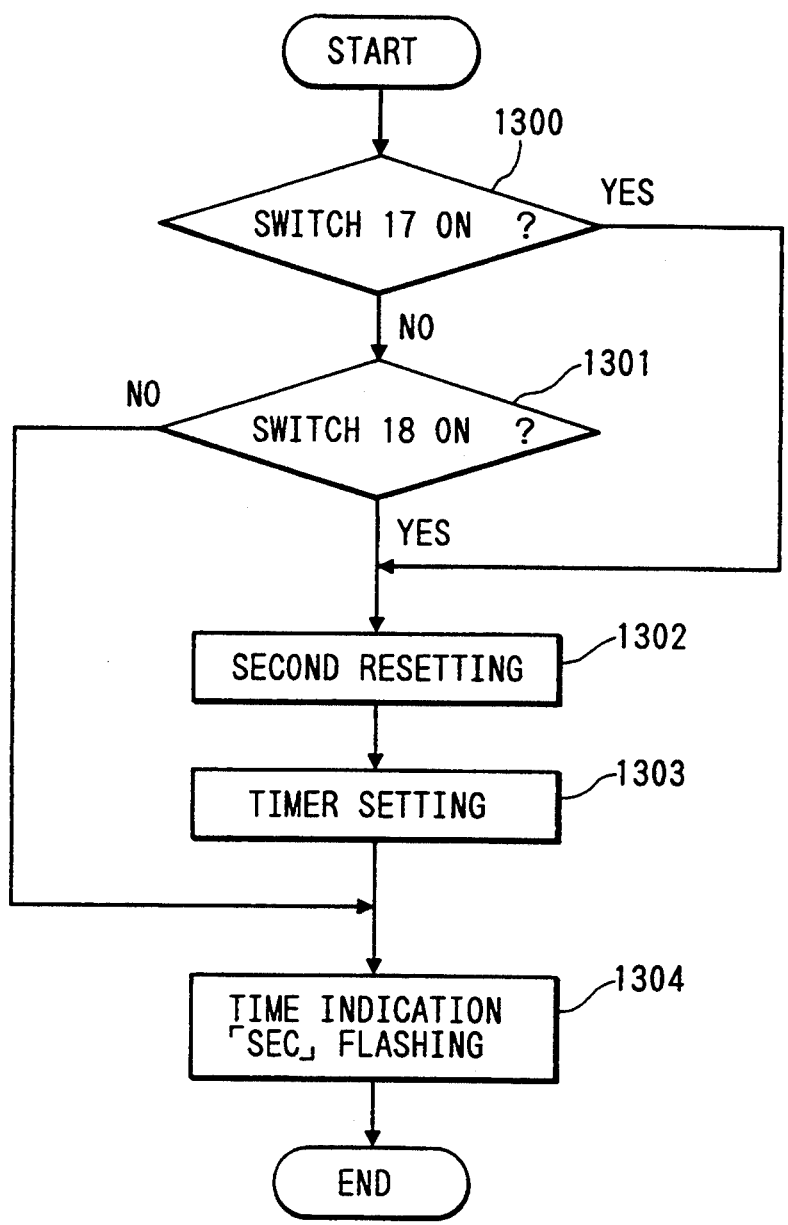

FIG. 13 shows still another embodiment of the second setting routine in which the count of seconds alone is reset if the UP- or DOWN-switch is turned on.

At first steps 1300, 1301 discriminate the state of the UP- and DOWN-switches, and the sequence proceeds to a step 1302 or 1304 respectively if either switch is on or both are off.

The step 1302 resets the seconds count of the clock, and then a step 1303 renews the count of the POWER OFF timer.

The step 1304 displays the current time of the clock, with flashing display of the digits for seconds. Then the sequence returns to (A).

Figure 14:
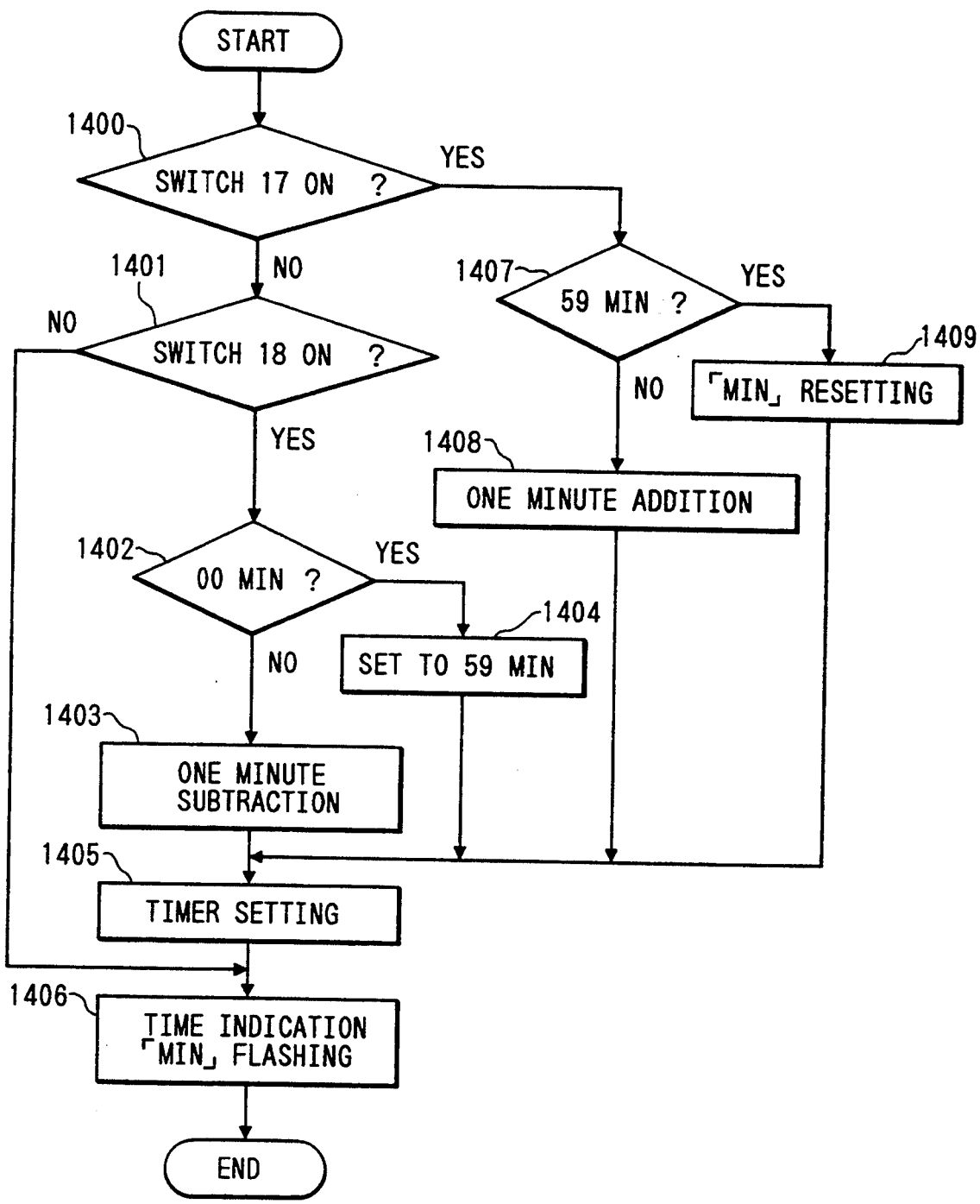

In the following there will be explained the minute setting routine shown in FIG. 14.

If at first a step 1400 identifies that the UP-switch 17 is on, a step 1407 discriminates whether the count of minutes of the clock is "59". If it is "59", a step 1409 sets the count of minutes to "0", but, if it is not "59", a step 1408 adds one to the count of minutes, and the sequence proceeds to a step 1405.

If the step 1400 identifies that the UP-switch is off, a step 1401 discriminates the state of the DOWN-switch, and, if it is on, a step 1402 discriminates whether the count of minutes is "0". If it is "0" a step 1404 shifts it to "59", but, if it is not "0", a step 1403 reduces it by one. Thereafter the sequence proceeds to the step 1405.

The step 1405 renews the count of the POWER OFF timer, and the sequence proceeds to a step 1406.

If the step 1401 identifies that the DOWN-switch is off also, the sequence proceeds to the step 1406.

The step 1406 displays the current time of the clock, with the display of minutes in flashing mode, and the sequence returns to (A).

Figure 15:
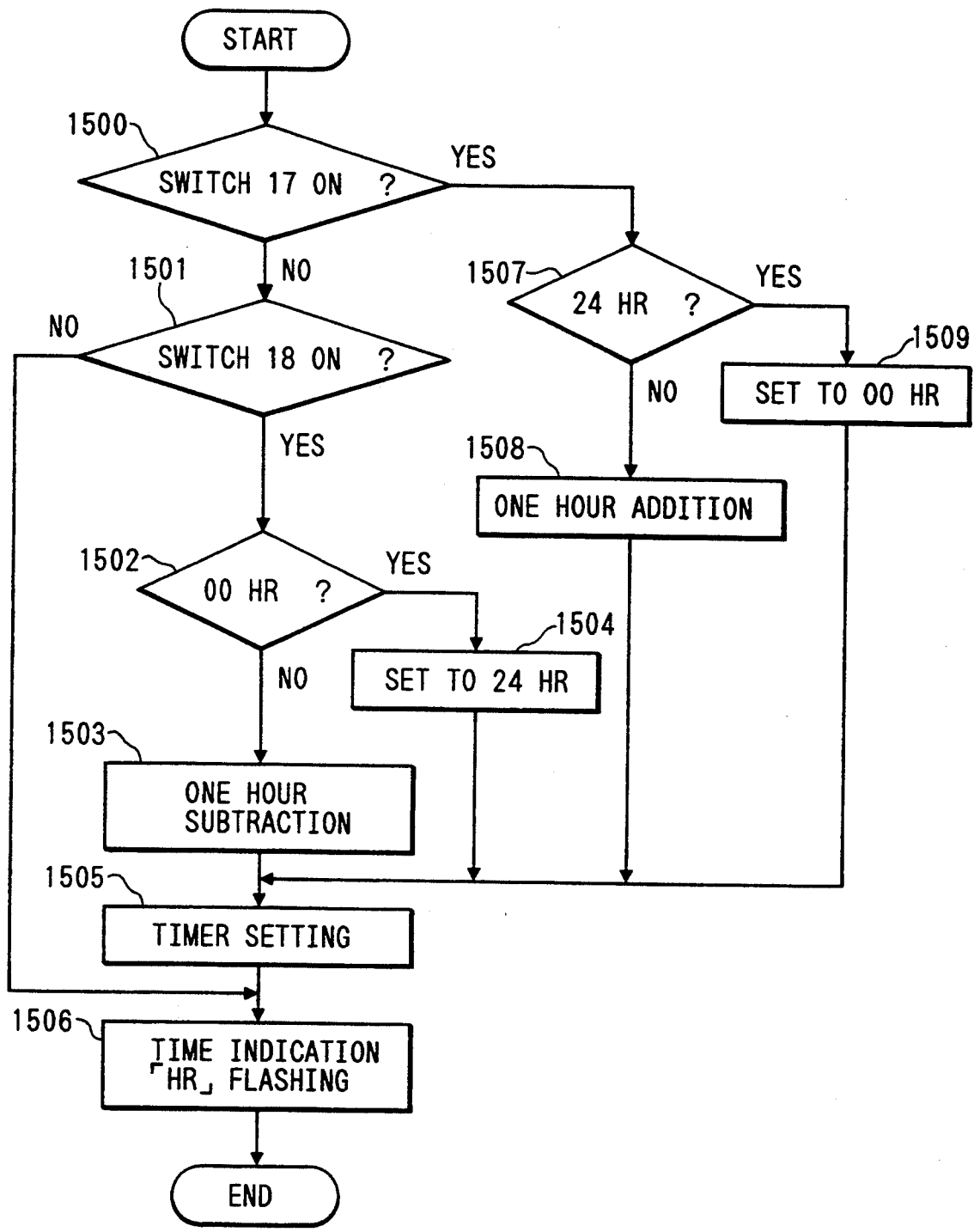

In the following there will be explained the hour setting routine shown in FIG. 15.

At first, if a step 1500 identifies that the UP-switch 17 is on, a step 1507 discriminates whether the count of hours of the clock is "24". If it is "24", a step 1509 resets said count to "0". If it is not "24", a step 1508 adds "1" to said count. Thereafter the sequence proceeds to a step 1505.

If the step 1500 identifies that the UP-switch is off, a step 1501 discriminates the state of the DOWN-switch, and, if it is on, a step 1502 discriminates whether the count of hours is "0". If it is "0", a step 1504 sets the count of hours to "24". If it is not "0", a step 1503 reduces said count of hours by one. Then the sequence proceeds to the step 1505.

Said step 1505 renews the count of the POWER OFF timer, and the sequence then proceeds to a step 1506.

If the step 1501 identifies that the DOWN-switch is also off, the sequence directly proceeds to the step 1506.

The step 1506 displays the current time of the clock, with flashing display of the hours, as shown in 442 in FIG. 1B, and the sequence returns to (A).

Figure 16:
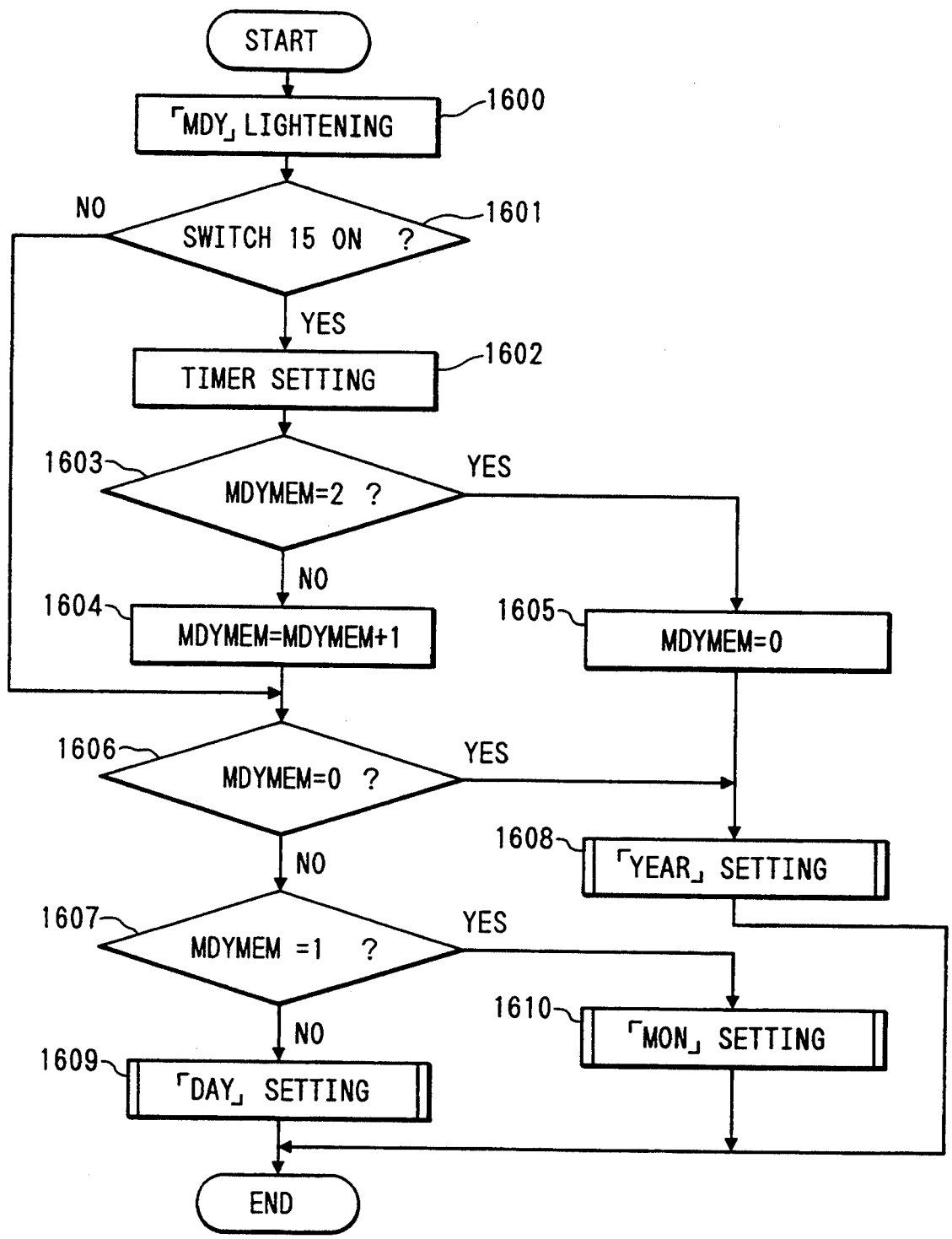

In the following there will be explained the date setting routine, with reference to FIG. 16.

At first a step 1600 turns on a segment "MDT", signifying month, day and year, as shown in 450 in FIG. 1B.

Then, if a step 1601 identifies that the selector switch 15 is on, a step 1602 renews the count of the POWER OFF timer and the sequence proceeds to a step 1603. If said selector switch 15 is off, the sequence proceeds to a step 1605.

The step 1603 discriminates whether the count of a memory MDYMEM, indicating the setting of month, day of year, is equal to "2". If said count is "2", a step 1608 sets said memory MDYMEM to "0", and the sequence proceeds to a step 1609.

If said count is not "2" in the step 1603, a step 1604 increases said count by one, and the sequence proceeds to a step 1605.

The sequence thereafter proceeds from a step 1606 or 1607 to a year setting routine in a step 1609, a day setting routine of a step 1607 or a month setting routine of a step 1610, respectively if said count is "0", "1" or "2".

Figure 17:
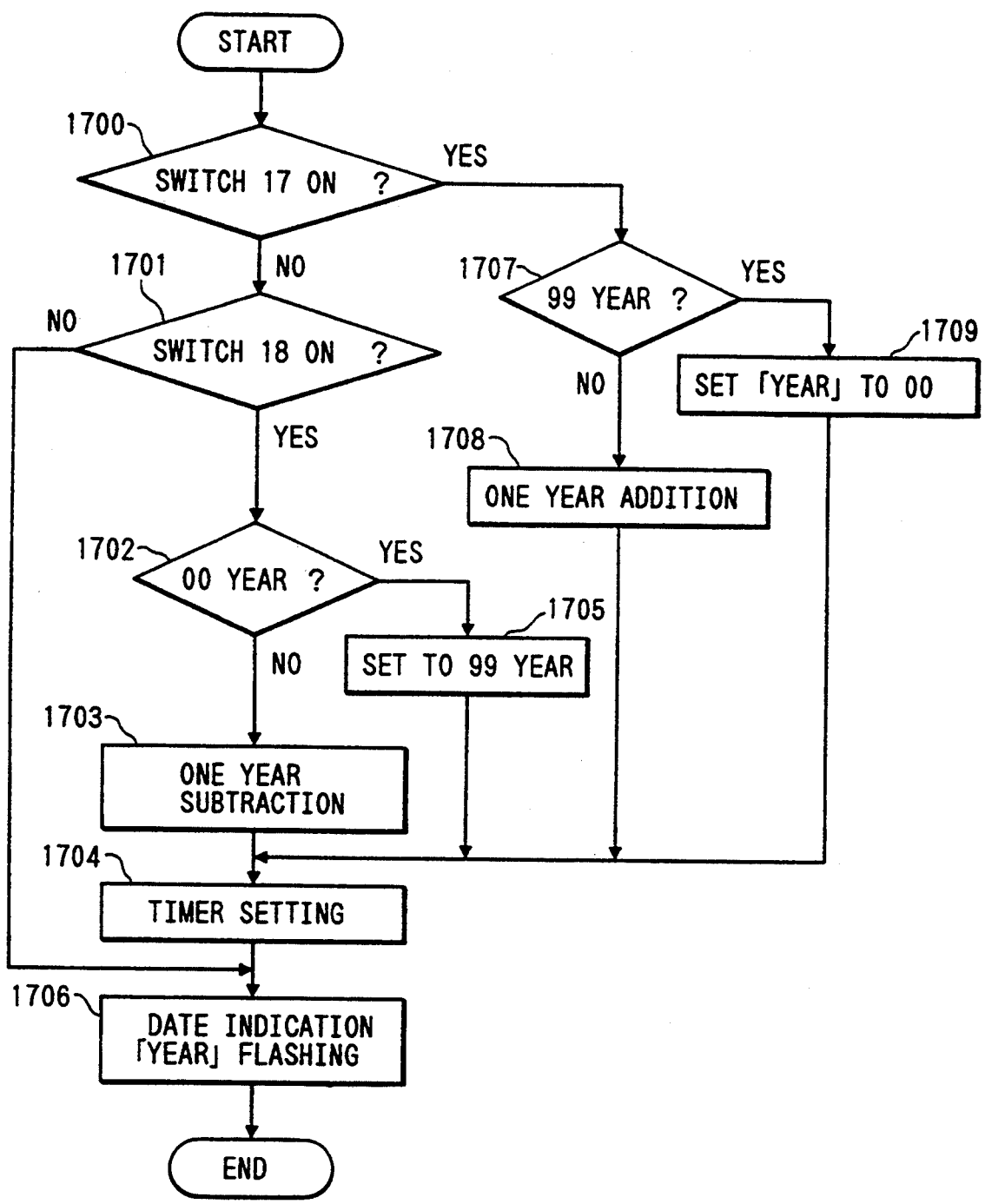

At first said year setting routine will be explained with reference to FIG. 17. At first, if a step 1700 identifies that the UP-switch 17 is on, a step 1707 discriminates whether the year is "99". If it is "99", a step 1709 sets the year to "00" and the sequence proceeds to the step 1704. If it is not "99", a step 1708 increases the year by one, and the sequence proceeds to the step 1704. On the other hand, if the step 1700 identifies that the UP-switch is off and a step 1701 identifies that the DOWN-switch 18 is on, a step 1702 discriminates whether the year is "00". If it is "00", a step 1705 sets the year to "99", but, if it is not "00", a step 1703 decreases the year by one. The sequence thereafter proceeds to the step 1704.

The step 1704 renews the count of the POWER OFF timer, and the sequence thereafter proceeds to the step 1706. If the step 1701 identifies that the DOWN-switch 18 is also off, the sequence directly proceeds to the step 1706.

The step 1706 displays the current date of the clock, with a flashing display of the fifth and sixth digits indicating the year, as shown in 451 in FIG. 1B, and the sequence returns to (A).

Figure 18:
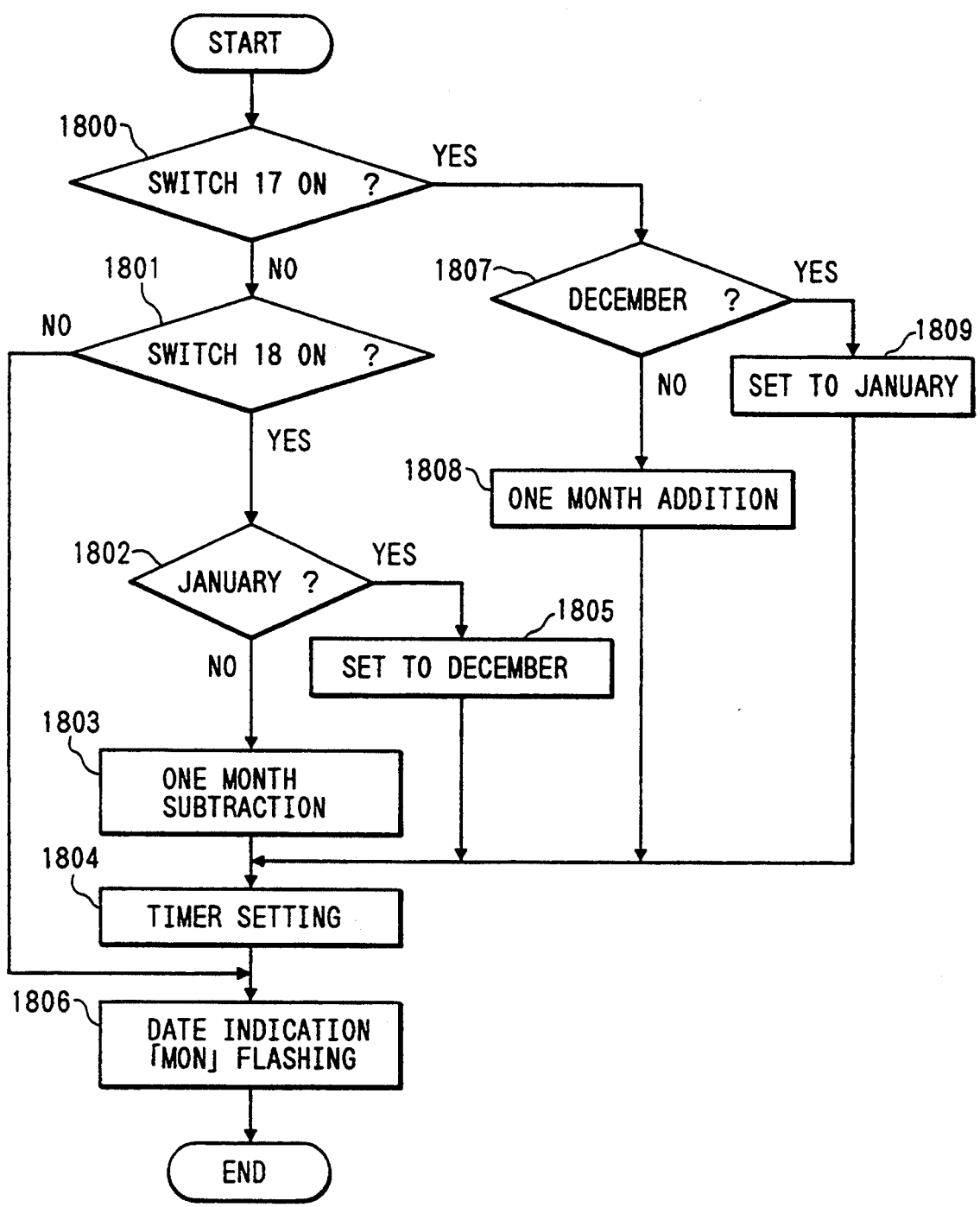

In the following there will be explained the month setting routine shown in FIG. 18. If a step 1800 identifies that the UP-switch 17 is on, a step 1807 discriminates whether the month is "12". If it is "12", a step 1809 sets the month at "01", but if it is not "12", a step 1808 increases the count of the month by one, and the sequence then proceeds to a step 1804. If the step 1800 identifies that the DOWN-switch is off and step 1801 identifies that the DOWN-switch is on, a step 1802 discriminates whether the month is "01". If it is "01", a step 1805 sets the month at "12", but, if it is not "01", a step 1803 reduces the count of the month by one, and the sequence thereafter proceeds to the step 1804.

The step 1804 renews the count of the POWER OFF timer, and the sequence proceeds to a step 1806. If the step 1801 identifies that the DOWN-switch is also off, the sequence directly proceeds to the step 1806.

The step 1806 displays the current date of the clock, with flashing display of the first and second digits indicating the month, as shown in 452 in FIG. 1B, and the sequence returns to (A).

Figure 19:
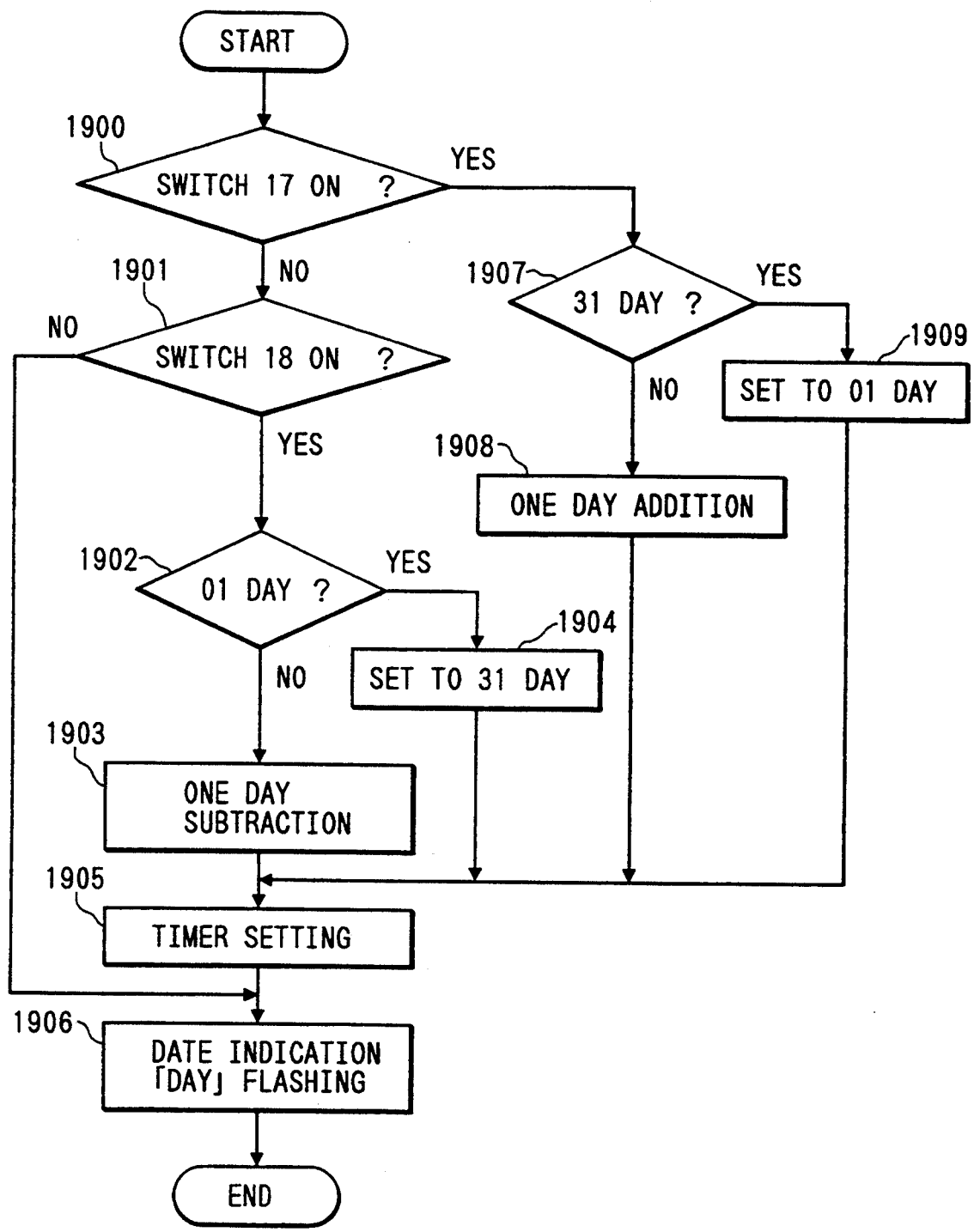

In the following there will be explained the day setting routine according to a flow chart shown in FIG. 19. If a step 1900 identifies that the UP-switch is on, a step 1907 discriminates whether the day is "31". If it is "31", a step 1909 sets the day at "01", and the sequence proceeds to a step 1905, but if it not "31", a step 1908 increases the day by one. If the step 1900 identifies that the UP-switch is off but a step 1901 identifies that the DOWN-switch is on, a step 1902 discriminates whether the day is "01". If it is "01" a step 1904 sets the day at "31" but if it is not "01", a step 1903 reduces the count of day by one, and the sequence thereafter proceeds to the step 1905.

The step 1905 renews the count of the POWER OFF timer, and the sequence proceeds to a step 1906. If the step 1901 identifies that the DOWN-switch is also off, the sequence directly proceeds to the step 1906.

The step 1906 displays the current data of the clock on the liquid crystal display, with a flashing display of the third and fourth digits indicating the day, and the sequence returns to (A).

In order to simplify the explanation, the count of the day is settable up to 31 even in February, April, June, September or November, but the control sequence may be realized in consideration of these shorter months. In such case, when the UP- or DOWN-switch is actuated, there is discriminated the current month, and the upper limit of the count of the day is set at "30", "28" or "29" according to the identified month. The corresponding flow chart is omitted as it is complex.

In the steps 24, 15 and 18 for displaying the photographing state, shown in FIG. 5, there are displayed the settings obtained according to the above-explained flow charts shown in FIGS. 6 to 19.

In the present embodiment, the exposure correction value is displayed with the first to fourth digits of the numeral display blocks, as shown in 412 or 414 in FIG. 1A. Though not shown in the flow chart in FIG. 6, the exposure correction value may be dispensed with if it is zero, as shown in 400 in FIG. 1A. Also, since the ID number is not necessary at the time of photographing, the display of the photographing condition only shows whether the automatic ID renewal is on or off, as shown in 435 in FIG. 1B. In this manner a complex display can be avoided at the time of the photographing operation.

Also, the time and the data are eliminated from the display at the time of the photographing operation as shown in 443, 453 in FIG. 1B, since it is not necessary to look at the time of the time and date at every photographing operation, once they are correctly adjusted. This also avoids complexity in the display at the time of the photographing operation. The recording mode is not displayed in the NORMAL mode. The SKIP mode is indicated by the segment SKIP as shown in 422 in FIG. 1B, and the INSERT mode is indicated by the segment INSERT as shown in 424 in FIG. 1B. Also the display "On" or "Off" as shown in 420, 421 or 423 in FIG. 1 is not given in the display at the time of the photographing operation. This fact also avoids complexity in the display at the photographing operation, improving the legibility of the display.

Figure 20:
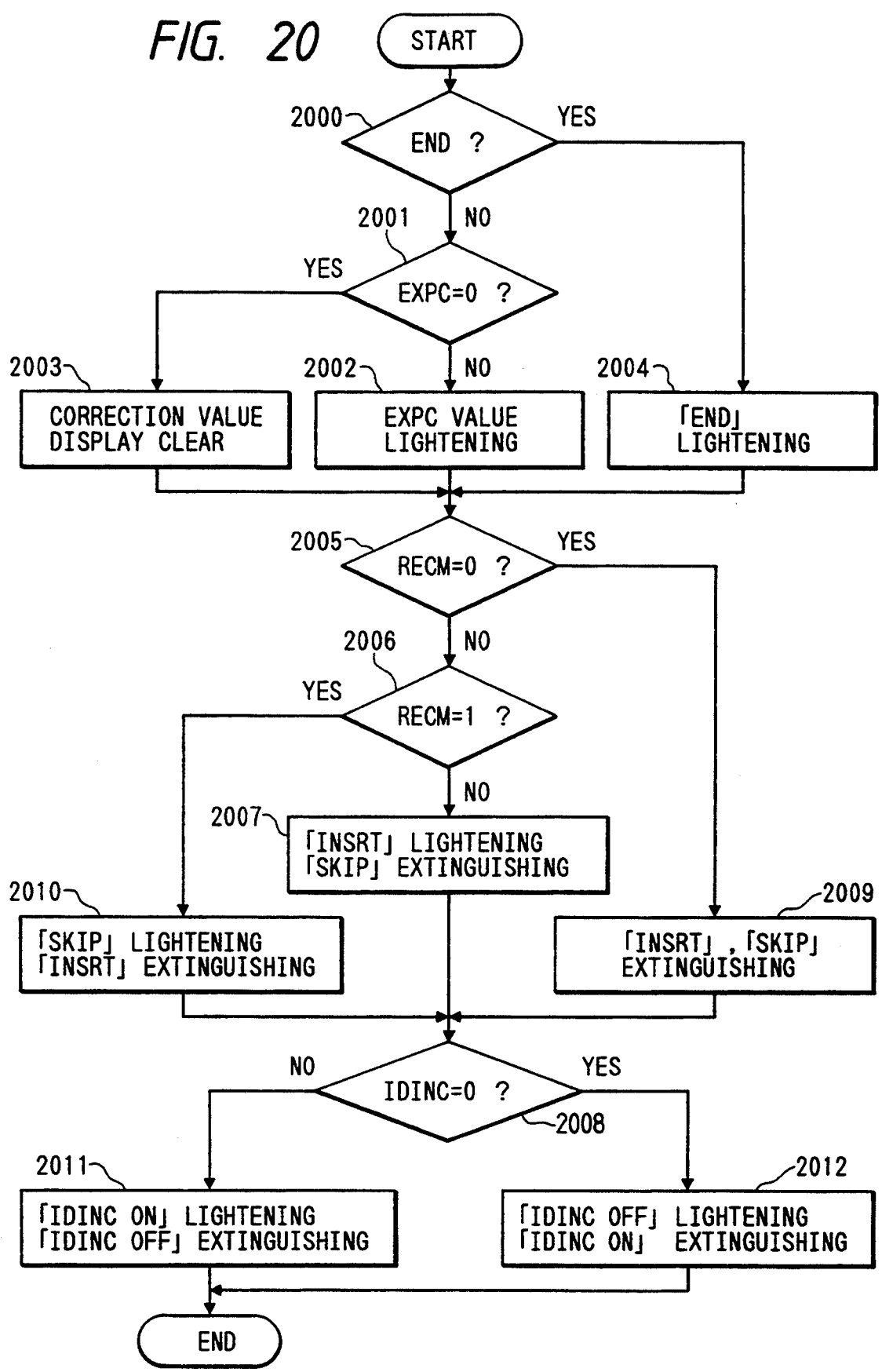

FIG. 20 shows a sequence of display at the time of the photographing operation according to of the step 29 in FIG. 5.

Figure 21:
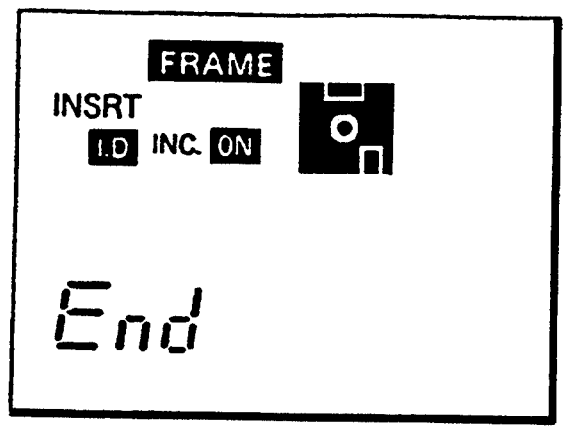

At first a step 2000 discriminates whether the loaded floppy disk is already full, and, if it is full, a step 2004 displays a message "End" with the first, second and third digits as shown in FIG. 21. Said discrimination is achieved by shifting the switch circuit 21, shown in FIG. 2, to the record detection circuit 20. As already explained in relation to FIG. 23, the discrimination of whether the disk is already full depends on the recording mode. If the disk is not full, a step 2001 checks the value of the memory EXPC storing the exposure correction value. If it is "0", a step 2003 turns off the first to fourth digits of the display and the sequence proceeds to a step 2005.

If the value of EXPC is not "0" in the step 2001, a step 2002 displays said value by the first to fourth digits of the display.

Subsequently the step 2005 checks the value of the MEMORY RECM indicating the recording mode. If said value is "0" indicating the NORMAL mode, a step 2009 turns off the segments "INSERT" and "SKIP", and the sequence proceeds to a step 2008.

If said value is "1" indicating the SKIP mode, a step 2010 turns on the segment SKIP and turns off the segment INSERT, and the sequence proceeds to the step 2008.

If said value is "2" indicating the INSERT mode, a step 2007 turns on the segment INSERT and turns off the segment SKIP, and the sequence proceeds to the step 2008.

Said step 2008 checks the memory ID INC indicating the automatic ID renewal mode, and, if the value of said memory is "0", a step 2012 turns on segments ID INC OFF and turns off segments ID INC ON.

If said value is "1", a step 2011 turns on the segments ID INC ON and turns off the segments ID INC OFF.

In the foregoing embodiment, the state of each switch is identified as "on" if said switch is closed at the time of the discrimination. Consequently, if a switch is continuously closed, said switch is identified as "on" in the check routine for said switch. Consequently, the display is switched at a predetermined interval if the mode switch for example is continuously closed. However, it is also possible not to accept the closing of a switch twice unless it is actually opened before the second closing.

In such case, the display is switched by closing the mode switch, and is not changed thereafter. For switching the display, the user is requested to open the switch and close it again.

As explained in the foregoing, the segment display elements for the exposure correction value are used, in the foregoing embodiments, also for displaying the ID number, time, date and state of recording mode, so that each segment display device can be made larger in size for better legibility.

Also, the relatively limited number of display segments in comparison with the kinds of data to be displayed allows the magnitude of the peripheral circuitry such as the driving IC to be reduced, thus achieving a lower cost and compactization.

Also, various display frames are used for the setting of various data, and the display for exposure correction, which has a relatively high frequency of use for the photographing operation, is displayed first next to the time of the display at the photographing operation. In this manner it is possible to shorten the operation time required before the photographing operation, and to simplify the content of the display.

More specifically, the setting of the exposure correction value in the conventional electronic camera has been conducted by the actuation of up/down buttons while an exclusive button for such setting is depressed.

However, as the number of setting items, such as the ID number or the continuous exposure mode in the still video camera, increases, it becomes necessary to use a single button for setting plural modes. In such a case the button has to be actuated plural times in order to reach a desired setting mode.

In the present embodiment, therefore, the exposure correction value setting mode, which has a relatively high frequency of setting, is given preference, as indicated by the step 19 in FIG. 5, with reference to other setting modes. Consequently, the ease of operation is improved without an unnecessary increase in the number of buttons.

Also in the present embodiment, if the recording areas of the video floppy disk 9 are already used, the exposure correction value is not displayed, but a message "End" is displayed by means of the display segments for the exposure correction value.

Conventionally, at the end of exposure operations, there has been displayed a "0" for the track number, or an "EJ", but such a display has been insufficient for conveying the meaning to the user. The present embodiment displays the message "End" with the display segments for the exposure correction value, in order to display the same meaning without increasing the number of the display segments. This method provides a clearer difference from the display in the normal photographing operation, ensuring easier recognition. Also, the display can be made larger and the circuit can be made more compact, since the number of display segments is not increased.

Also in the present embodiment, exclusive display segments are provided for the INSERT mode and the SKIP mode, but not for the NORMAL modes. In the NORMAL mode, the segments INSERT and SKIP are made to flash (turned on) while a message "Off" is turned on (flashing). On the other hand, in the INSERT or SKIP mode, the corresponding exclusive segment is made to flash (turned on), while a message "On" is turned on (flashing). Said message "On" or "Off" is displayed with the 7-segment display elements used for indicating time, etc.;

Thus, the present invention provided an increase of the display in size of the, compactness of the circuitry due to the reduction in the number of display segments, and an improvement in legibility of the display.

The foregoing embodiment employs a liquid crystal display, but there may be employed other displays such as a plasma display, a cathode ray tube or an electroluminescent display.

Also in said embodiment, a flashing display is used for the data being set, but it is also possible to indicate the data being set, for example, by varying the color or the density of said data.

The exposure correction in the foregoing embodiments is achieved by the exposure control member 2 controlled by the drive circuit 3, but it is also achievable by the control of the drive conditions of the image pickup device 4 or by other suitable means.

The present embodiment is featured by the fact that it is capable of providing each of various displays shown in FIG. 1.

As explained in detail above, the foregoing embodiment has the advantages of improving the legibility of the display, reducing the display unit in comparison with the kinds of information to be displayed, and simplifying the drive circuit for the display.

What is claimed is:

1. A camera apparatus for recording received image information, comprising:
   recording means for recording the image information;
   information display means for displaying data;
   exposure correction means for correcting an exposure characteristic of said image information, and for providing exposure correction information in response to a setting operation;
   means for generating an identification code to be recorded together with the image information; and
   control means having a first display mode for causing said information display means to display the correction information from said exposure correction means when the exposure correction information has been set, and a second display mode for causing said information display means to display the identification code generated by said generating means instead of said correction information when the exposure correction information has not been set.

2. An apparatus according to claim 1, wherein said information display means comprises a liquid crystal display panel.

3. An apparatus according to claim 1, further comprising conversion means for converting said image into an electrical image signal, and wherein an exposure correction means is adapted to effect exposure correction by correcting a conversion characteristic of said conversion means.

4. An apparatus according to claim 1, wherein said identification code comprises a 4-digit number.

5. An apparatus according to claim 1, further comprising:
   a manual setting member for manually setting either said first display mode or said second display mode;
   wherein said control means is adapted to switch between said first and second display modes in response to the setting of said manual setting member.

6. An apparatus according to claim 1, wherein said recording means records said image information on a recording medium.

7. An apparatus according to claim 6, wherein said recording medium comprises a disk shaped medium.

8. An apparatus according to claim 6, wherein said recording means comprises magnetic recording means.

9. A camera apparatus comprising:
   a first display element for displaying a first recording mode;
   a second display element for displaying a second recording mode different from said first recording mode;
   setting means for setting said first or second recording mode, or a third recording mode different from said first and second recording mode;
   a third display element different from said first and second display elements; and
   control means for causing said first and second display elements to respectively display the first and second modes when said first or second mode is set by said setting means, and for causing said third display element to perform a display together with said first or second display element when said third mode is set.

10. An apparatus according to claim 9, wherein said first, second and third display elements are provided on a common display panel.

11. An apparatus according to claim 9, wherein said first and second display elements are adapted to display characters corresponding to said first and second modes respectively.

12. An apparatus according to claim 11, wherein said third display element is adapted to display a message "OFF".

13. An apparatus according to claim 9, wherein said setting means comprises a manually operable member.

14. A camera apparatus for receiving an image and recording image information corresponding to the image, comprising:
   recording means for recording the image information;
   information display means for displaying data;
   means for generating an identification code to be recorded together with said image information; and
   switch means for selecting either a first display mode for causing said information display means to display the identification code generated by said generating means, or a second display mode for causing said information display means to display image display characteristics of said apparatus instead of said identification code, wherein said second display mode displays information on an exposure state of said image.

15. An apparatus according to claim 14, wherein said information display means comprises a liquid crystal display panel.

16. An apparatus according to claim 14, wherein said identification code comprises a 4-digit number.

17. An apparatus according to claim 14, further comprising:
   a manual setting member for manually setting either said first display mode or said second display mode;
   wherein said control means is adapted to switch between said first and second display modes in response to the setting of said manual setting member.

18. An apparatus according to claim 14, wherein said recording means records said image information on a recording medium.

19. An apparatus according to claim 17, wherein said recording medium comprises disk shaped medium.

20. An apparatus according to claim 17, wherein said recording means comprises magnetic recording means.

21. A camera apparatus for recording in a memory means information corresponding to a received image, comprising:
   recording means for recording the image information;
   information display means having segments indicating a polarity;
   exposure correction means for correcting an exposure of said image and providing correction information;
   detection means for detecting a remaining amount of the memory means and providing information corresponding thereto; and
   control means provided with a first display mode for causing said information display means to display the correction information from said exposure correction means, and a second display mode for causing said display means to display the information from said detection means instead of said correction information without using said polarity segments.

22. An apparatus according to claim 21, wherein said recording means causes said memory means to record information corresponding to said image.

23. An apparatus according to claim 21, wherein said information display means comprises a liquid crystal display panel.

24. An apparatus according to claim 21, further comprising conversion means for converting the received image into an electrical image signal;

wherein said exposure correction means is adapted to effect exposure correction by correcting a conversion characteristic of said conversion means.

25. An apparatus according to claim 21, further comprising:

a manual setting member for manually setting either said first display mode or said second display mode;

wherein said control means is adapted to switch between said first and second display modes in response to the setting of said manual setting member.

26. An apparatus according to claim 21, wherein said memory means comprises a disk-shaped recording medium.

* * * * *

UNITED STATES PATENT AND TRADEMARK OFFICE
CERTIFICATE OF CORRECTION

PATENT NO. : 5,359,422          Page 1 of 3
DATED      : October 25, 1994
INVENTOR(S): Nobuo Fukushima It is certified that error appears in the above-indentified patent and that said Letters Patent is hereby corrected as shown below:

Column 1

Line 40,   "been" should be deleted;
    Line 51,   "improved" should read --improves--.

Column 2

Line 62,   "the" should be deleted.

Column 3

Line 41,   "segment "⌐⌐" " should read --segment ⌐⌐⌙⌙.--.

Column 4

Line 2,    "circuit 7" should read --circuit 7,--.

UNITED STATES PATENT AND TRADEMARK OFFICE
CERTIFICATE OF CORRECTION

PATENT NO. : 5,359,422
DATED : October 25, 1994
INVENTOR(S) : Nobuo Fukushima

It is certified that error appears in the above-indentified patent and that said Letters Patent is hereby corrected as shown below:

Column 5

Line 31,   "preceds" should read --precedes--;
    Line 33,   "signal" should read --information signal--.

Column 6

Line 8,    "FIG. 1)," should read --FIG. 1A),--;
    Line 12,   "FIG. 4)," should read --FIG. 1A),--;
    Line 31,   "Also" should read --Also,--;
    Line 44,   "FIG. 1A." should read FIG. 1B.--;
    Line 45,   "FIG. 4." should read FIG. 1B.--.

Column 7

Line 2,    "it" should read --it is--;
    Line 7,    "Also" should read --Also,--;
    Line 17,   "FIG. 1)," should read --FIG. 1B),--.

Column 10

Line 50,   "at the time of" should read --at-- and "at every" should read --at the time of every--;
    Line 59,   FIG. 1" should read --FIG. 1B--;
    Line 64,   "of" should be deleted and "step 29" should read --step 16--.

Column 12

Line 45,   "provided" should read --provides--;
    Line 46,   "display in size of the," should read --size of the display,--.

UNITED STATES PATENT AND TRADEMARK OFFICE
CERTIFICATE OF CORRECTION

PATENT NO. : 5,359,422
DATED : October 25, 1994
INVENTOR(S) : Nobuo Fukushima

It is certified that error appears in the above-indentified patent and that said Letters Patent is hereby corrected as shown below:

<u>Column 13</u>

Line 28, "said" should read --an--
    Line 29, "an" (second occurrence) should read --said--.

<u>Column 14</u>

Line 6, "modes" should read --modes,--;
    Line 48, "disk" should read --a disk--.

Signed and Sealed this

Eighteenth Day of April, 1995

*Attest:*

BRUCE LEHMAN

*Attesting Officer*      Commissioner of Patents and Trademarks